(12) United States Patent
Rosenberg

(10) Patent No.: US 11,228,681 B1
(45) Date of Patent: Jan. 18, 2022

(54) SYSTEMS FOR SUMMARIZING CONTACT CENTER CALLS AND METHODS OF USING SAME

(71) Applicant: Five9, Inc., San Ramon, CA (US)

(72) Inventor: Jonathan Rosenberg, Freehold, NJ (US)

(73) Assignee: FIVE9, INC., San Ramon, CA (US)

( * ) Notice: Subject to any disclaimer, the term of this patent is extended or adjusted under 35 U.S.C. 154(b) by 0 days.

(21) Appl. No.: 17/213,335

(22) Filed: Mar. 26, 2021

Related U.S. Application Data

(60) Provisional application No. 63/057,931, filed on Jul. 29, 2020.

(51) Int. Cl.
*H04M 3/51* (2006.01)
*G10L 15/26* (2006.01)

(52) U.S. Cl.
CPC ........... *H04M 3/5133* (2013.01); *G10L 15/26* (2013.01); *H04M 3/5141* (2013.01); *H04M 3/5175* (2013.01); *H04M 3/5183* (2013.01)

(58) Field of Classification Search
None
See application file for complete search history.

(56) References Cited

U.S. PATENT DOCUMENTS

| | | | |
|---|---|---|---|
| 6,879,685 B1 * | 4/2005 | Peterson | G06Q 10/0639 379/265.11 |
| 10,554,817 B1 | 2/2020 | Sullivan et al. | |
| 2016/0119477 A1 * | 4/2016 | Sharpe | H04M 3/5233 379/265.09 |
| 2018/0124241 A1 * | 5/2018 | Vijaywargi | H04M 3/523 |
| 2020/0081939 A1 * | 3/2020 | Subramaniam | G06N 5/022 |
| 2020/0210521 A1 * | 7/2020 | Hutchins | G06F 16/986 |
| 2020/0349614 A1 * | 11/2020 | Batcha | H04L 51/14 |
| 2020/0380623 A1 * | 12/2020 | Ranjan | G06Q 50/163 |

OTHER PUBLICATIONS

Notification of Transmittal of the International Search Report and the Written Opinion of the International Searching Authority, or the Declaration, for PCT/US21/24272, dated Jun. 4, 2021.

\* cited by examiner

*Primary Examiner* — Harry S Hong
(74) *Attorney, Agent, or Firm* — Jones Day

(57) ABSTRACT

A method for creating a textual summary of a call includes transcribing speech to text in real time using a speech-to-text generating unit configured for execution upon one or more data processors, automatically matching, in real-time, text to predetermined intents and extracted entities using an intent recognizing unit for execution upon the one or more data processors, automatically mapping the predetermined intents and extracted entities into a call summary using one or more mapping functions, and displaying the call summary using an agent user interface for execution upon the one or more data processors. A contact center call summarization system may include a contact center communication device, a speech-to-text generating unit, an intent recognizing unit, and an agent user interface.

20 Claims, 26 Drawing Sheets

500

Conversation Transcript

> then from there we'll copy it

*47 seconds ago Jasmin Allares Allares*

> is it be so difficult I don't get why this is being such a give me such a hard time

*Customer 40 seconds ago*

> I apologize for the inconvenience at let me request for another remote control

*33 seconds ago Jasmin Allares Allares*

> I gave it to you

*Customer 31 seconds ago*

> thank you

*30 seconds ago Jasmin Allares Allares*

> before you buy. I mean your password just please type is first-year on your Notepad

Summary 400

Call Summary

Call accepted by Agent.
This call involves an issue for which a case already exists.
Resolution of Call: The case associated with this call is closed - customer does not need further assistance with this case.
Reason for Call: the customer needs assistance logging into the Five9 application.
The customer's call back number is 7046781954
The customer's call back number is
Reason for Call: the customer needs guidance with slow application issues.
Resolution of Call: The case associated with this call is open - customer needs further assistance with this case.
The agent initiated a Zoom screenshare during this call to assist the customer.
The agent created a new case during this call to track this issue.
Resolution of Call: Customer will call the agent back at a later time to further discuss the issue.
Resolution of Call: The agent needs time to investigate the issue and thus will call the customer back at a later time.

[ Edit Summary ]  [ Confirm ]

*FIG. 3A*

Conversation Transcript 500

> then from there we'll copy it

*47 seconds ago Jasmin Allares Allares*

> is it be so difficult I don't get why this is being such a give me such a hard time

*Customer 40 seconds ago*

> I apologize for the inconvenience at let me request for another remote control

*33 seconds ago Jasmin Allares Allares*

> I gave it to you

*Customer 31 seconds ago*

> thank you

*30 seconds ago Jasmin Allares Allares*

> before you buy. I mean your password just please type is first-year on your Notepad

Summary 400

Call Summary

Call accepted by Agent.
This call involves an issue for which a case already exists.
Resolution of Call: The case associated with this call is closed - customer does not need further assistance with this case.
Reason for Call: the customer needs assistance logging into the Five9 application.
The customer's call back number is 7046781954
The customer's call back number is
Reason for Call: the customer needs guidance with slow application issues.
Resolution of Call: The case associated with this call is open - customer needs further assistance with this case.
The agent initiated a Zoom screenshare during this call to assist the customer.
The agent created a new case during this call to track this issue.

Resolution of Call: The agent needs time to investigate the issue and thus will call the customer back at a later time.

Conversation Transcript then from there we'll copy it 47 seconds ago Jasmin Allares Allares is it be so difficult I don't get why this is being such a give me such a hard time Customer 40 seconds ago I apologize for the inconvenience at let me request for another remote control 33 seconds ago Jasmin Allares Allares I gave it to you Customer 31 seconds ago thank you 30 seconds ago Jasmin Allares Allares before you buy. I mean your password just please type is first-year on your Notepad

Summary      400

Call Summary

Call accepted by Agent.
This call involves an issue for which a case already exists.
Resolution of Call: The case associated with this call is closed - customer does not need further assistance with this case.
Reason for Call: the customer needs assistance logging into the Five9 application.
The customer's call back number is 7046781954
The customer's call back number is
Reason for Call: the customer needs guidance with slow application issues.
Resolution of Call: The case associated with this call is open - customer needs further assistance with this case.
The agent initiated a Zoom screenshare during this call to assist the customer.
The agent created a new case during this call to track this issue.
Resolution of Call: Customer will call the agent back at a later time to further discuss the issue.
Resolution of Call: The agent needs time to investigate the issue and thus will call the customer back at a later time.

---

Resolution of Call: The agent needs time to investigate the issue and thus will call the customer back at a later time.

Conversation Transcript

> then from there
> we'll copy it 47 seconds ago Jasmin Allares Allares

> is it be so difficult I
> don't get why this
> is being such a
> give me such a
> hard time Customer 40 seconds ago > I apologize for the
> inconvenience at
> let me request for
> another remote
> control 33 seconds ago Jasmin Allares Allares > I gave it to you Customer 31 seconds ago > thank you 30 seconds ago Jasmin Allares Allares > before you buy. I
> mean your
> password just
> please type is first-
> year on your
> Notepad

Summary  400

Call Summary

Call accepted by Agent.
This call involves an issue for which a case already exists.
Resolution of Call: The case associated with this call is closed - customer does not need further assistance with this case.
Reason for Call: the customer needs assistance logging into the Five9 application.
The customer's call back number is 7046781954
The customer's call back number is
Reason for Call: the customer needs guidance with slow application issues.

> Resolution of Call: The agent needs time to investigate the issue and thus will call the customer back at a later time.

The agent initiated a Zoom screenshare during this call to assist the customer.
The agent created a new case during this call to track this issue.
Resolution of Call: Customer will call the agent back at a later time to further discuss the issue.
Resolution of Call: The agent needs time to investigate the issue and thus will call the customer back at a later time.

*FIG. 6C*

Conversation Transcript

> then from there we'll copy it 47 seconds ago Jasmin Allares Allares

> is it be so difficult I don't get why this is being such a give me such a hard time Customer 40 seconds ago > I apologize for the inconvenience at let me request for another remote control 33 seconds ago Jasmin Allares Allares > I gave it to you Customer 31 seconds ago > thank you 30 seconds ago Jasmin Allares Allares > before you buy. I mean your password just please type is first-year on your Notepad

Summary 400

Call Summary

Call accepted by Agent.
This call involves an issue for which a case already exists.
Resolution of Call: The case associated with this call is closed - customer does not need further assistance with this case.
Reason for Call: the customer needs assistance logging into the Five9 application.
The customer's call back number is 7046781954
The customer's call back number is
Reason for Call: the customer needs guidance with slow application issues.
Resolution of Call: The case associated with this call is open - customer needs further assistance with this case.
The agent initiated a Zoom screenshare during this call to assist the customer.
The agent created a new case during this call to track this issue.
Resolution of Call: Customer [Add] ck at a later time to further discuss the issue. —520
Resolution of Call: The agent needs time to investigate the issue and thus will call the customer back at a later time.

*FIG. 7B*

SYSTEMS FOR SUMMARIZING CONTACT CENTER CALLS AND METHODS OF USING SAME

CROSS-REFERENCE TO RELATED APPLICATION

This application claims the benefit of U.S. Provisional Patent Application No. 63/057,931, filed on Jul. 29, 2020, which is hereby incorporated by reference in its entirety for all purposes.

BACKGROUND

1. Field

The present disclosure relates to systems for summarizing contact center calls, and methods thereof. For example, systems for summarizing contact center calls may include an agent or customer communication unit, a speech-to-text generating unit, an intent recognizing unit, an agent user interface, and an intent configuration unit. A method of using the system may include transcribing speech to text, matching text to intents and extracted entities, and mapping intents and associated entities to a readable summary using a mapping function.

2. Description of Related Art

Contact center agents are often asked to prepare a summary of calls that they take with customers. These summaries are used for many purposes such as providing a summary to a different agent when the customer calls back in the future. They can also be used for analytics. Unfortunately, many agents do not produce these summaries because they take time to create and agents face pressure to talk to customers rather than create call summaries. Even when such call summaries are created, they are often incomplete or inaccurate. They can also vary in style from agent to agent making it difficult for an agent to read a summary written by another agent.

Traditional methods for summarizing contact center calls typically include transcribing audio recordings of the contact center call, and using the transcribed text information as a summary of the call. Other solutions may include incorporating an entire transcript of a contact center call into a database such as a customer relationship management system. However, these approaches are tedious because they require an agent to read an entire transcript, which can be lengthy and difficult to comprehend.

Other methods for summarizing contact center calls may apply artificial intelligence (hereinafter "AI") techniques for text summarization. This is common for natural language processing systems, and is widely used for techniques like producing a summary of a news article or selecting highlights from an article. Unfortunately, these techniques do not work well on transcripts of contact center calls. Human to human conversations are much less structured than a written document. Transcripts of contact center calls also typically include errors due to the inaccuracies of speech recognition. These problems with traditional natural language processing text summarization techniques make them not a good fit for use with contact center call summarization.

SUMMARY

This Summary is provided to introduce a selection of concepts in a simplified form that are further described below in the Detailed Description. This Summary is not intended to identify key features or essential features of the invention, nor is it intended to be used as an aid in determining the scope of the claims.

In an aspect, a method for creating a textual summary of a call includes transcribing speech to text in real time using a speech-to-text generating unit configured for execution upon one or more data processors; automatically matching, in real-time, text to predetermined intents and extracted entities using an intent recognizing unit for execution upon the one or more data processors; automatically mapping the predetermined intents and extracted entities into a call summary using one or more mapping functions; and displaying the call summary using an agent user interface for execution upon the one or more data processors.

A contact center call summarization system for generating a contact center call summary includes a contact center communication device configured to communicate with a customer communication device via a network; a speech-to-text generating unit configured for execution upon one or more data processors and configured to convert speech of a customer communication into text; an intent recognizing unit for execution upon the one or more data processors and configured to receive transcribed speech from the speech-to-text generating unit and use machine learning to match speech to intents and entities; an intent configuration unit for execution upon the one or more data processors and configured to update or create intents, entities, and associated training phrases for the intent recognizing unit; and an agent user interface for execution upon the one or more data processors and configured to display a call summary received from the intent recognizing unit to allow an agent to edit, replace, reorder, delete, or confirm text segments, intents, or entities of the call summary.

Other features and aspects may be apparent from the following detailed description and the drawings.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIGS. 3A, 3B, and 3C are diagrams illustrating examples of user interfaces that allow an agent to confirm or edit a call summary generated using the system of FIG. 1.

FIGS. 4A, 4B, 4C, and 4D are diagrams illustrating examples of user interfaces that allow an agent to remove false positives in a call summary generated using the system of FIG. 1.

FIGS. 5A, 5B, 5C, 5D, 5E, 5F, 5G, 5H are diagrams illustrating examples of user interfaces that allow an agent to update entities in a call summary generated using the system of FIG. 1.

FIGS. 6A, 6B, and 6C are diagrams illustrating examples of user interfaces that allow an agent to reorder a call summary generated using the system of FIG. 1.

FIGS. 7A, 7B, and 7C are diagrams illustrating examples of user interfaces that allow an agent to add missing intents to a call summary generated using the system of FIG. 1

Figure 1:
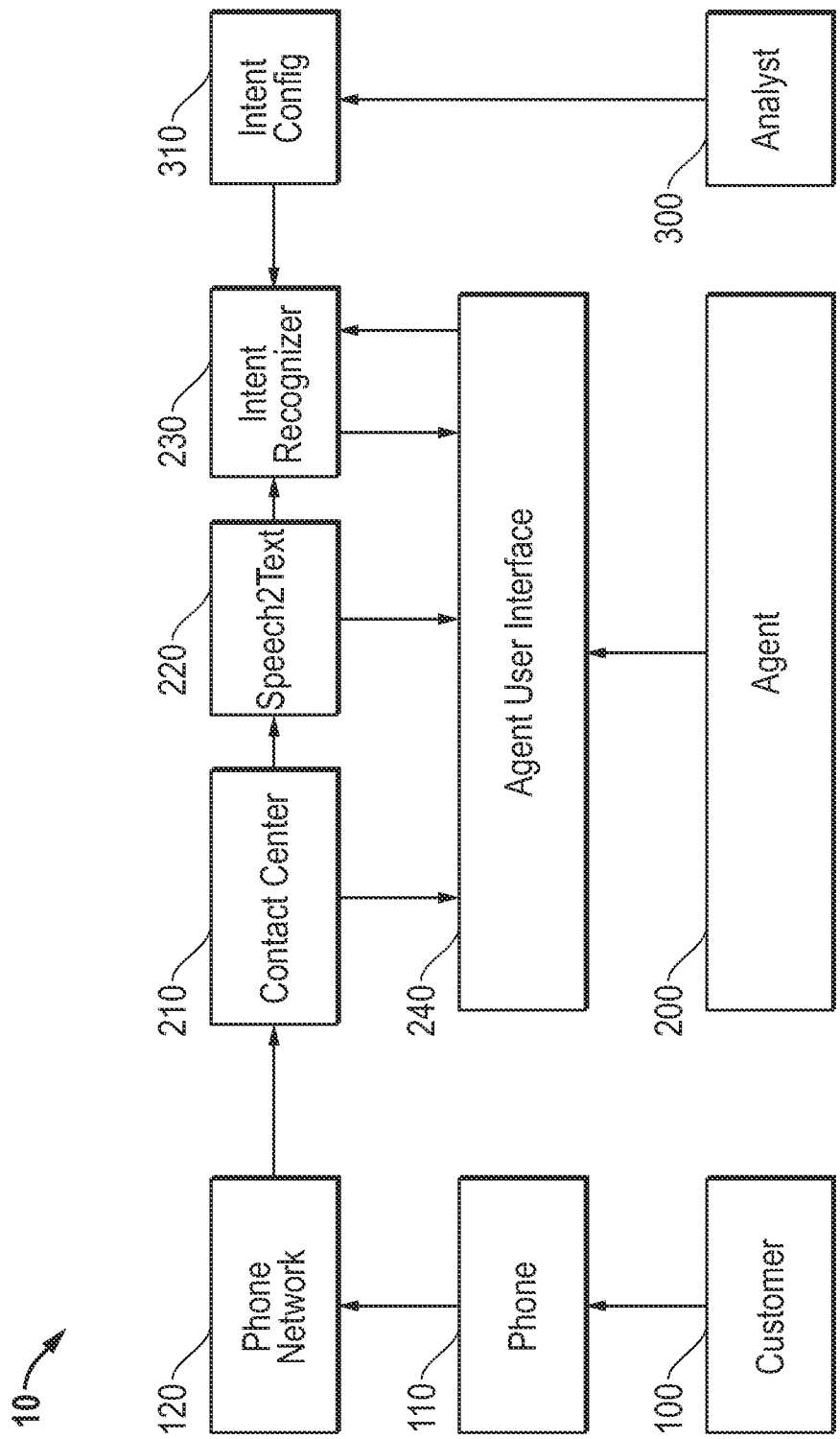
FIG. 1 is a diagram illustrating an example of a system for summarizing contact center calls.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating an example of a system 10 for summarizing contact center calls. The system 10 can be used by a customer 100, an agent 200, and an analyst 300 to generate a summary of a contact center call between the customer 100 and the agent 200. Referring to FIG. 1, a contact center call summarization system 10 may include a customer communication device 110 such as a telephone, smartphone, tablet, or other electronic communication device, a network 120 such as a phone or internet network to which the customer communication device 110 is configured to connect, and a contact center 210 which is a server/cloud configured to process the call with the customer communication device 110 through the network 120.

The contact center 210 may communicate with a speech-to-text generating unit 220 which is configured to convert speech of a customer communication into text, and the speech-to-text generating unit 220 may communicate with an intent recognizing unit 230 which is configured to use machine learning to match speech to intents and associated entities. The contact center call summarization system 10 may further include an agent user interface 240 which may be a communication device including a desktop or mobile or table application showing information to the agent, and is configured to communicate with each of the contact center 210, the speech-to-text generating unit 220, and the intent recognizing unit 230. The contact center call summarization system 10 may further include an intent configuration unit 310 that can be used by the analyst 300 to create intents, entities, and associated training phrases for the intent recognizing unit 230.

As already provided above, in one example, there are three end users of the contact center call summarization system 10—the customer, the agent, and the analyst.

In an example, the customer 100 places a call to, or receives a call from, the contact center. They do this via the customer communication device 110, which connects their call through the network 120 to the contact center 210. The agent 200 has a user interface 240, which connects to the contact center 210 for traditional contact center functions like answering a caller, placing a caller on hold, transferring a caller, among other functions.

Still referring to FIG. 1, the audio stream generated during the call between the agent 200 and the customer 100 may be converted from speech to text, in real-time, using the speech-to-text generating unit 220. The speech-to-text generating unit 220 may use automated speech to text technologies such as off-the-shelf technology offered by Google, Microsoft, Amazon, IBM, among others.

The resulting real-time transcription may be fed into the intent recognizing unit 230. In this example, the intent recognizing unit 230 receives the transcribed speech in segments, and uses traditional machine learning algorithms to match the segments of the speech to intents and associated entities. The intents and entities may be predefined. For example, an analyst 300 may utilize the intent configuration unit 310 to create predefined intents, entities, and associated training phrases. For example, the intent configuration unit 310 may use a tool such as Google's Dialogflow™, among other tools, to generate predefined intents, entities, and training phrases. In this example, as the real-time transcribed text is sent to the intent recognizing unit 230, it is matched with the predefined or pre-generated intents and entities created by the analyst 300 and already communicated to the intent recognizing unit 230 by the intent configuration unit 310.

In addition, the analyst 300 may create, for each intent, a mapping back to a sentence or sentences, which represent a good summary of the intent. The mapping may also include variable substitutions that correspond to detected intents. For example, if an intent was "ProductReturn" and the one entity in the intent was "ProductName," the mapping may be as follows: "Customer states that they are unhappy with $ProductName and want to return it." In this example, when the intent is matched in real time, the intent recognizing unit 230 may use the mapping and create a string of text that forms part of the call summary. This string of text can then be sent to the agent 200 by being illustrated on the agent user interface 240. As new intents are detected, more text strings may appended to the end of the call summary. Accordingly, a real-time, incrementally growing summary of the call is generated.

To ensure accuracy, the agent 200 can confirm and edit the results of the call summary using the agent user interface 240. For example, the agent 200 may be given the choice to confirm or edit a call summary, remove intents, text, or entire text strings from the call summary list, add intents, text, or entire text strings to the call summary list, change or update the value of an entity in the call summary, and reorder text or text strings in the call summary. These actions that may be performed by the agent 200 using the agent user interface 240 are described in further detail in reference with FIGS. 3-7. Once the agent is satisfied with the call summary, the agent can confirm the result. This confirmation ensures that the final summary is always accurate. The resulting call summary is generated much faster than a manual agent-generated call summary while still ensuring uniformity of structure using a fixed mapping from intent to text. Further, in one example, the changes made by the agent 200 to the call summary may be used to adjust an AI model of the intent recognizing unit 230 to provide even more accurate call summaries in a fully automated way.

It should be appreciated that the different units and/or devices illustrated in FIG. 1, including the customer communication device 110, the network 120, the contact center 210, the speech-to-text generating unit 220, the intent recognizing unit 230, the agent user interface 240, and the intent configuration unit 310, can be software executing on one or more processors, such as shown in the computer/network drawings described in more detail below in reference to FIGS. 9 and 10.

Figure 2:
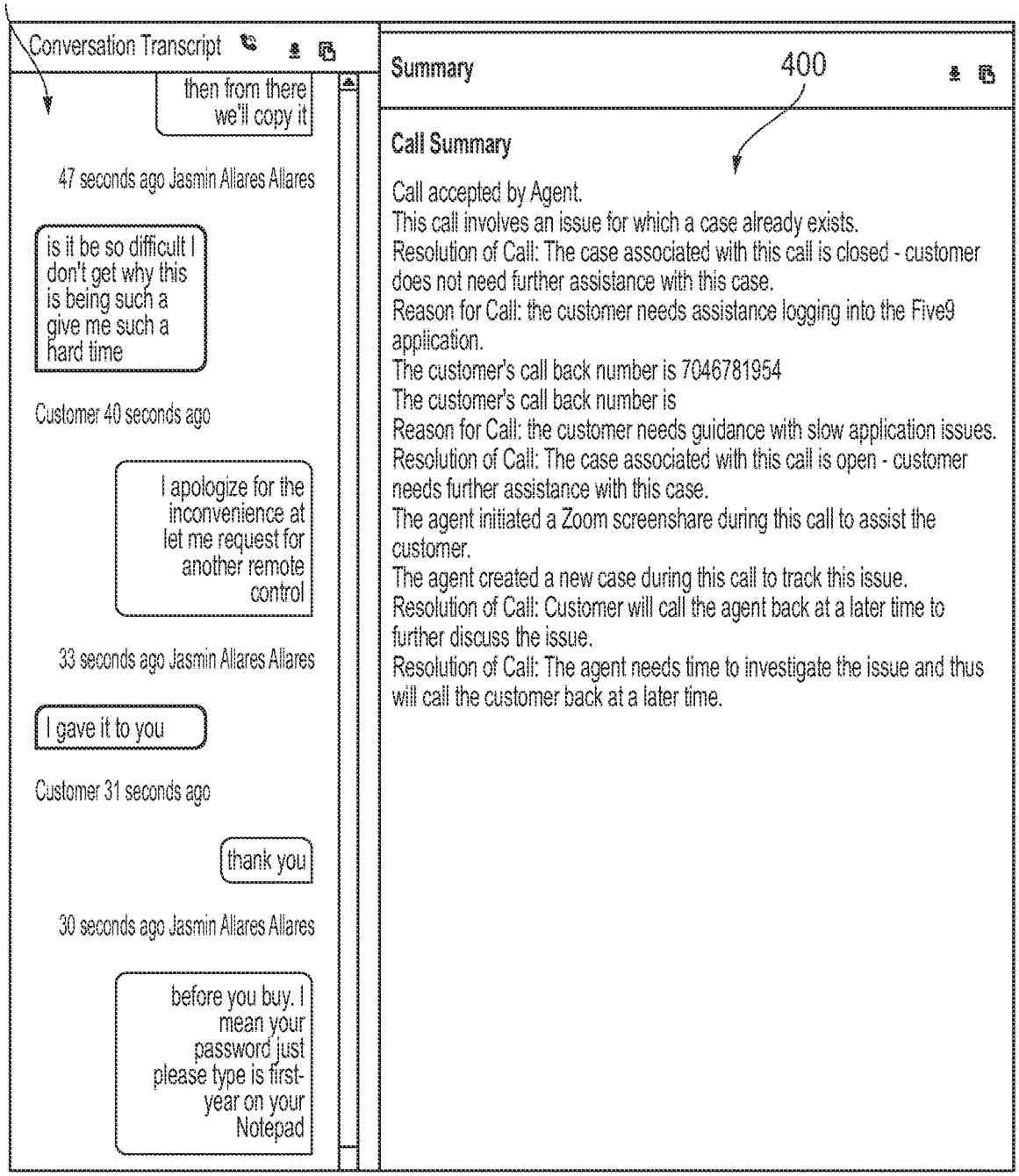
FIG. 2 is a diagram illustrating an example of a user interface display that includes a call summary generated using the system of FIG. 1.

FIG. 2 is a diagram illustrating an example of a user interface display that includes a call summary generated using the system 10 of FIG. 1. Referring to FIG. 2, an example of a user interface that illustrates a call summary 400 overlaying or side-by-side with a conversation transcript 500. The call summary is generated by the contact center call summarization system 10 describe above in reference with FIG. 1, and can be illustrated on a display of the agent user interface 240 of the system 10.

Figure 3B:
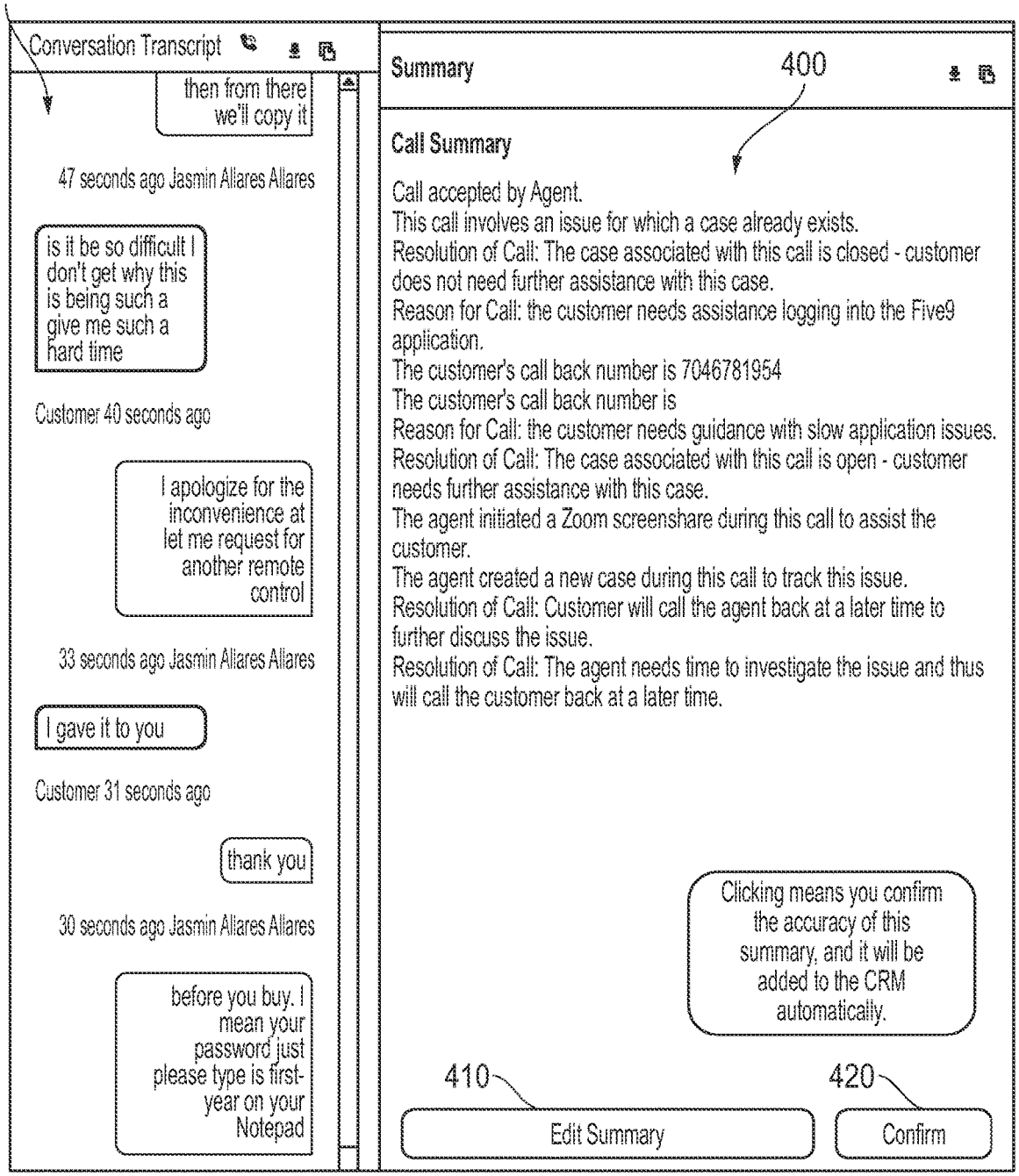
Figure 3C:
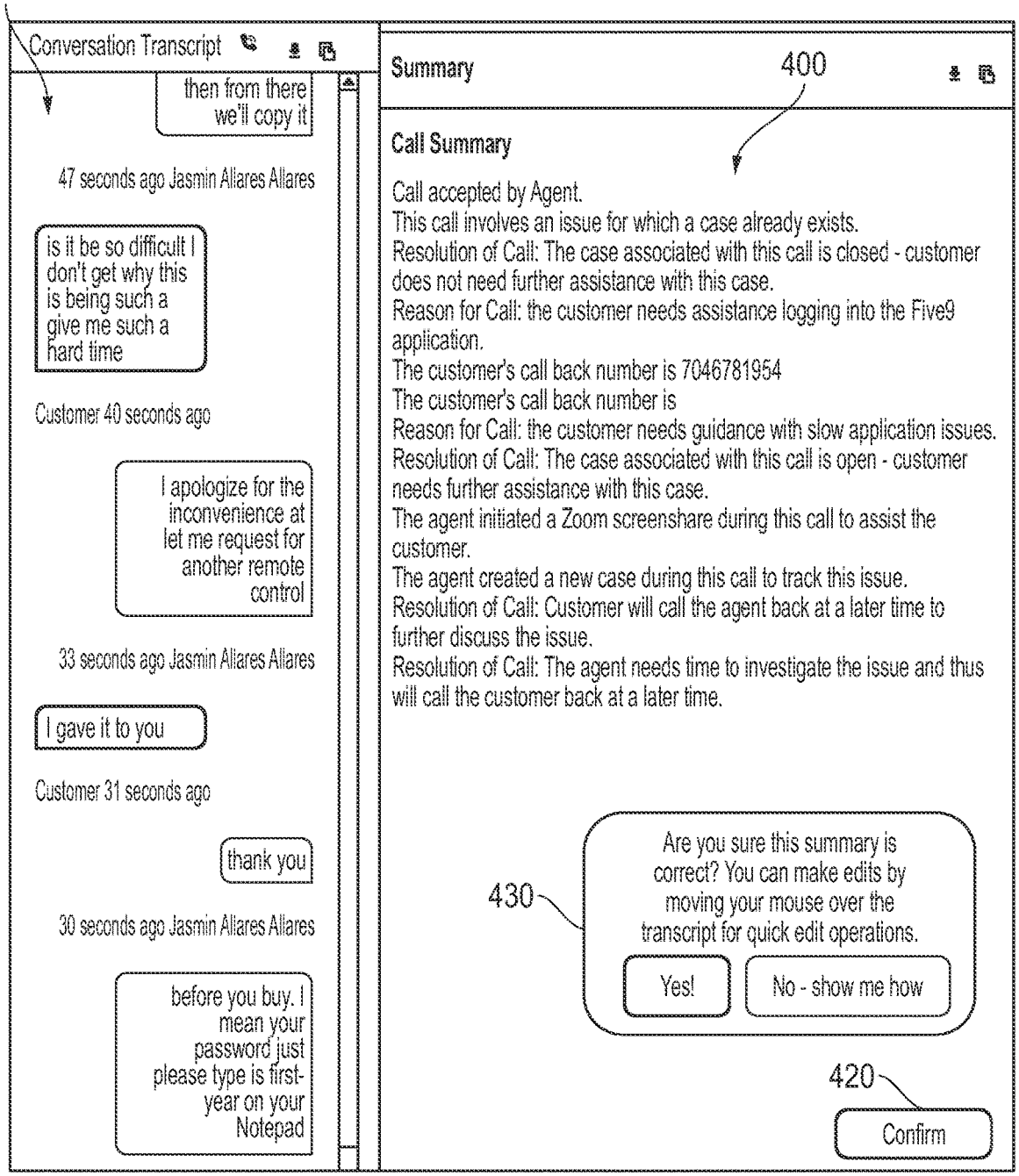

FIGS. 3A, 3B, and 3C are diagrams illustrating examples of user interfaces that allow an agent to confirm or edit a call summary generated using the system 10 of FIG. 1.

Referring to FIG. 3A, the call summary 400 and conversation transcript 500 are again illustrated along with an "Edit Summary" button 410 and a "Confirm" button 420. In this example, the buttons 410, 420 are provided at the bottom of the user interface and may be provided in different colors. This alerts the agent that they are expected to edit and confirm the summary. By providing a "Confirm" button, it is clear to the agent that by pressing this button they are confirming the summary. Referring to FIG. 3B, hovering over the "Confirm" or "Edit Summary" buttons may provide more information for clarity such as clarifying that confirming the summary will add the summary to the Customer Relationship Management (CRM) system.

Referring to FIG. 3C, as an alternative or in addition to providing an "Edit Summary" button, an agent—after pressing the confirm button 420 for a first time—may be provided with a dialog box 430 giving them the option to edit the call summary if they have not previously edited the summary. The dialog box may ask the agent to verify that the summary is accurate, and may also present an option for showing a tutorial on how to edit the summary. In general and in some example, data on how often agents edit may be tracked. In one example, the dialog box 430 may pop up more often if an agent is not making edits.

Figure 4A:
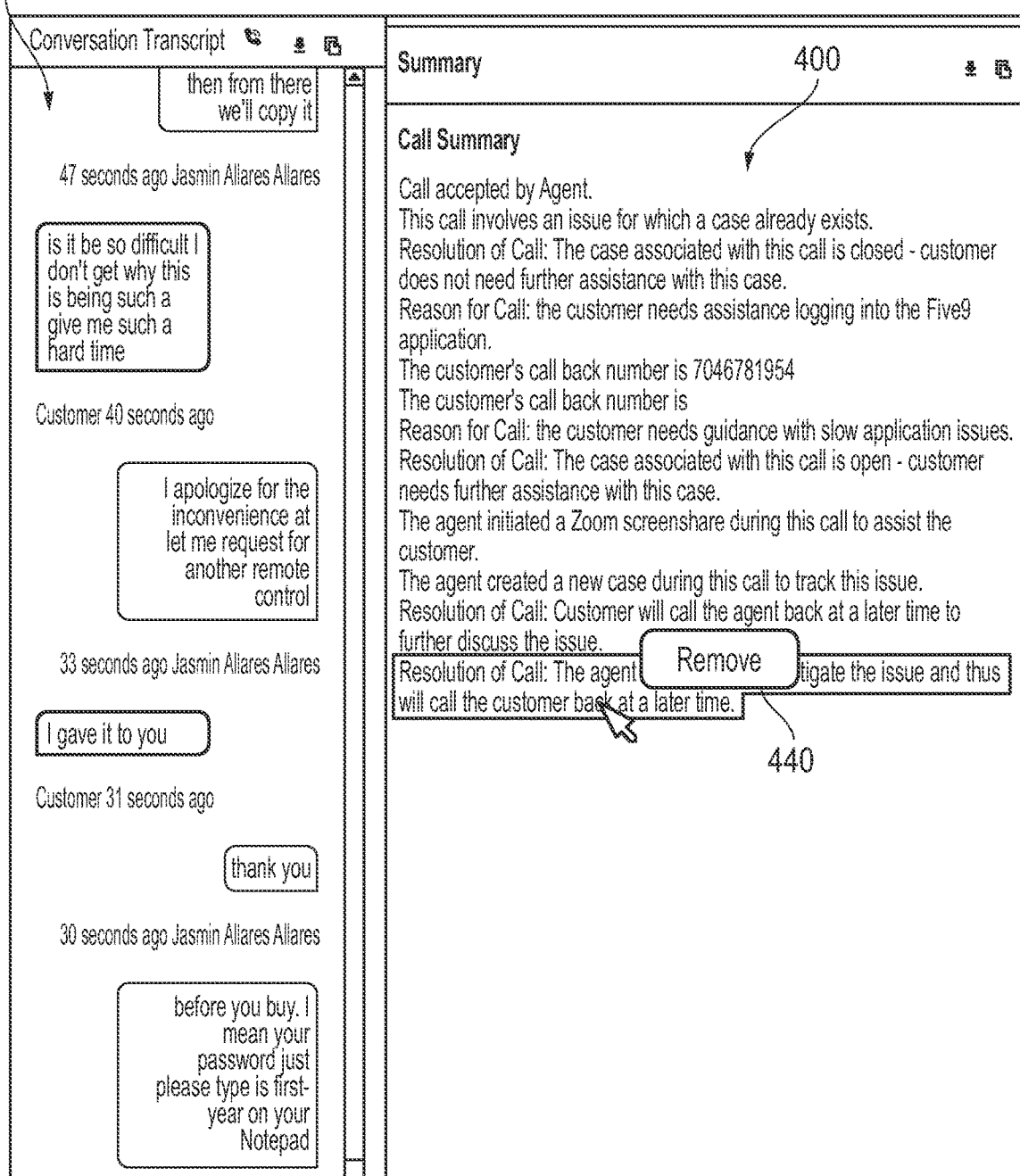
Figure 4B:
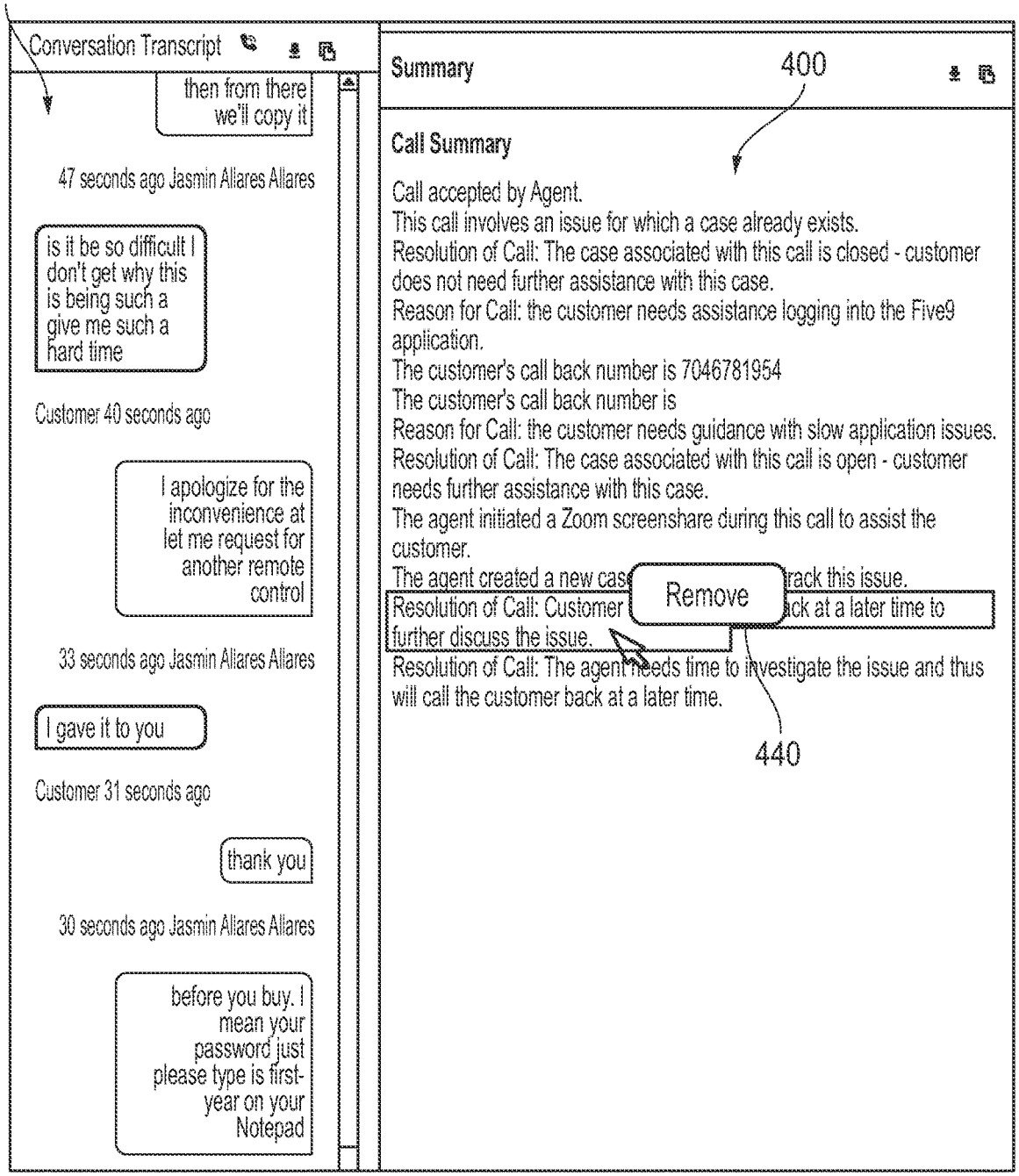
Figure 4C:
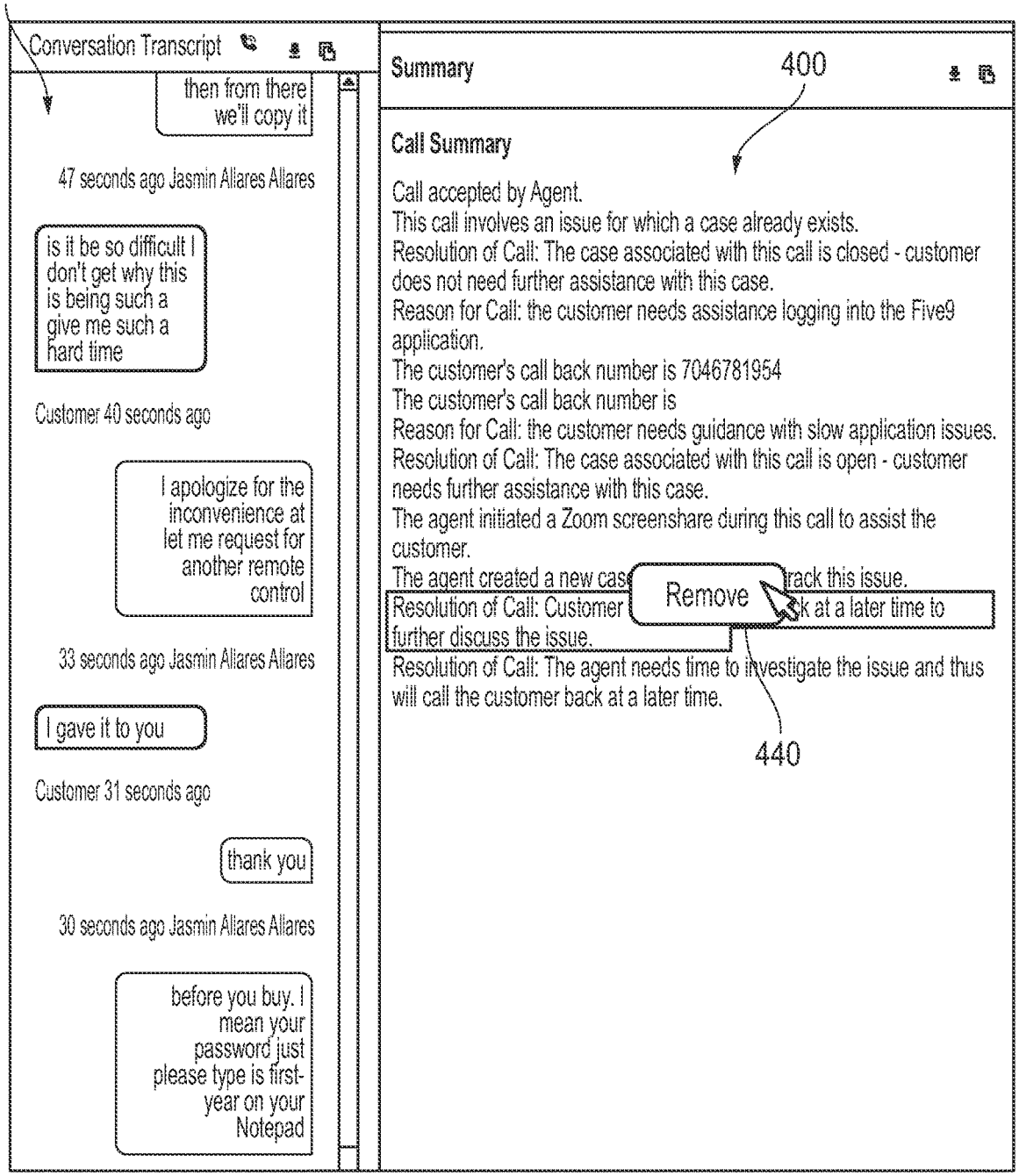

FIGS. 4A, 4B, 4C, and 4D are diagrams illustrating examples of user interfaces that allow an agent to remove false positives in a call summary generated using the system 10 of FIG. 1. Referring to FIG. 4A, the call summary 400 and conversation transcript 500 are again illustrated. In this example, an agent may place a mouse pointer over a text segment in the call summary and immediately the text segment may be highlighted and the agent is prompted to remove the text segment by pressing a remove button 440. FIG. 4B illustrates the result of the agent moving the mouse pointer over another text segment; similarly, that segment is highlighted and another remove button 440 appears adjacent the highlighted text. In FIG. 4C, the agent selects to remove the highlighted text by pressing the remove button 440, and in FIG. 4D, the highlighted text disappears along with the remove button. All text below the removed text may move upwards to make it clear that the old text was removed.

While this is only one example user interface for removing intents, text, or text segments in a call summary, other interfaces may be used such as an agent double clicking a text segment to prompt an edit function and pressing the delete key on a keyboard to remove the text entirely. In another example, the agent may be required to press on the text, rather than hover over the text, to prompt the remove button. In another example, the agent may be required to drag and drop text segments to a trash icon or area, among other examples of user interfaces for removing text segments. In another example, a trash icon may appear next to the text, and the agent clicks on the trash icon to remove the summary element.

Figure 5A:
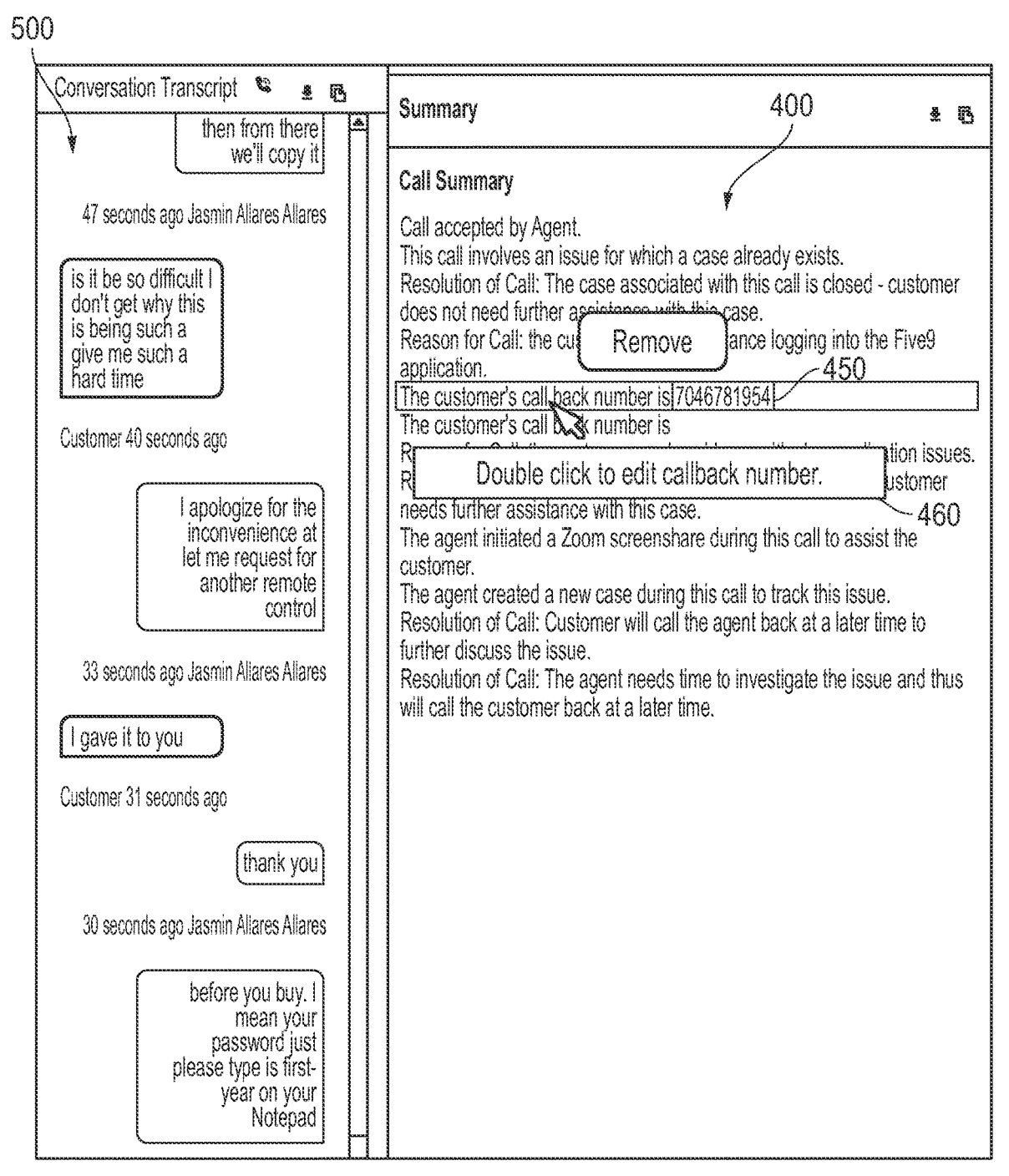
Figure 5B:
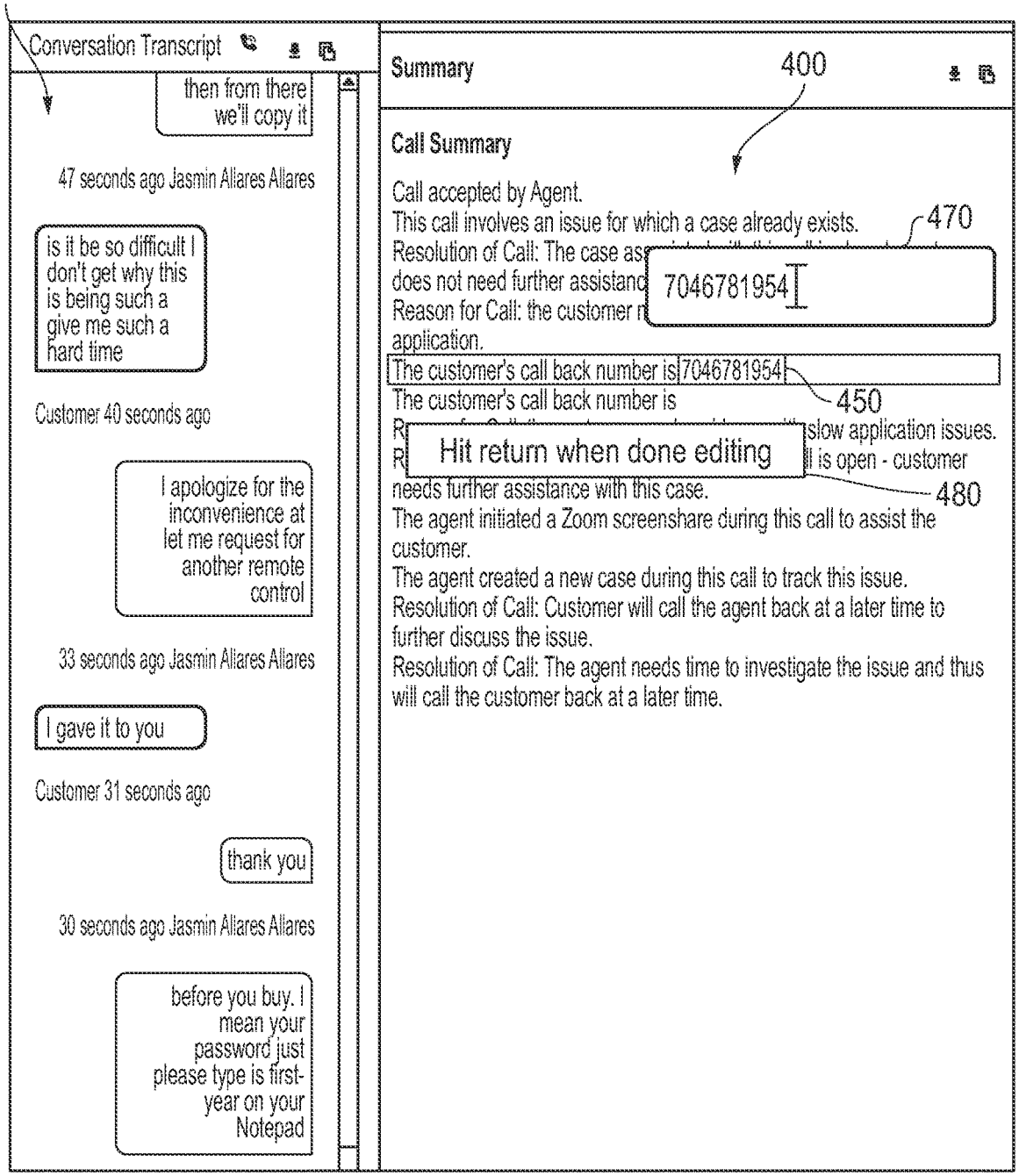

FIGS. 5A-5H are diagrams illustrating examples of user interfaces that allow an agent to update entities in a call summary generated using the system 10 of FIG. 1. Referring to FIG. 5A, an agent can move a mouse pointer to anywhere over the text associated with an intent that has one or more entities 450. When the text segment has an entity, an additional tooltip 460, which may appears then fade away, may provide instructions to the agent on how to edit the specific entity. The entity itself may be highlighted in some way to help the agent know that this is the portion of the text segment being referred to for editing. In an example, the entity may be highlighted in a different color, underlined, boxed, bolded, or distinguished from the remaining text in any other way.

Figure 5C:
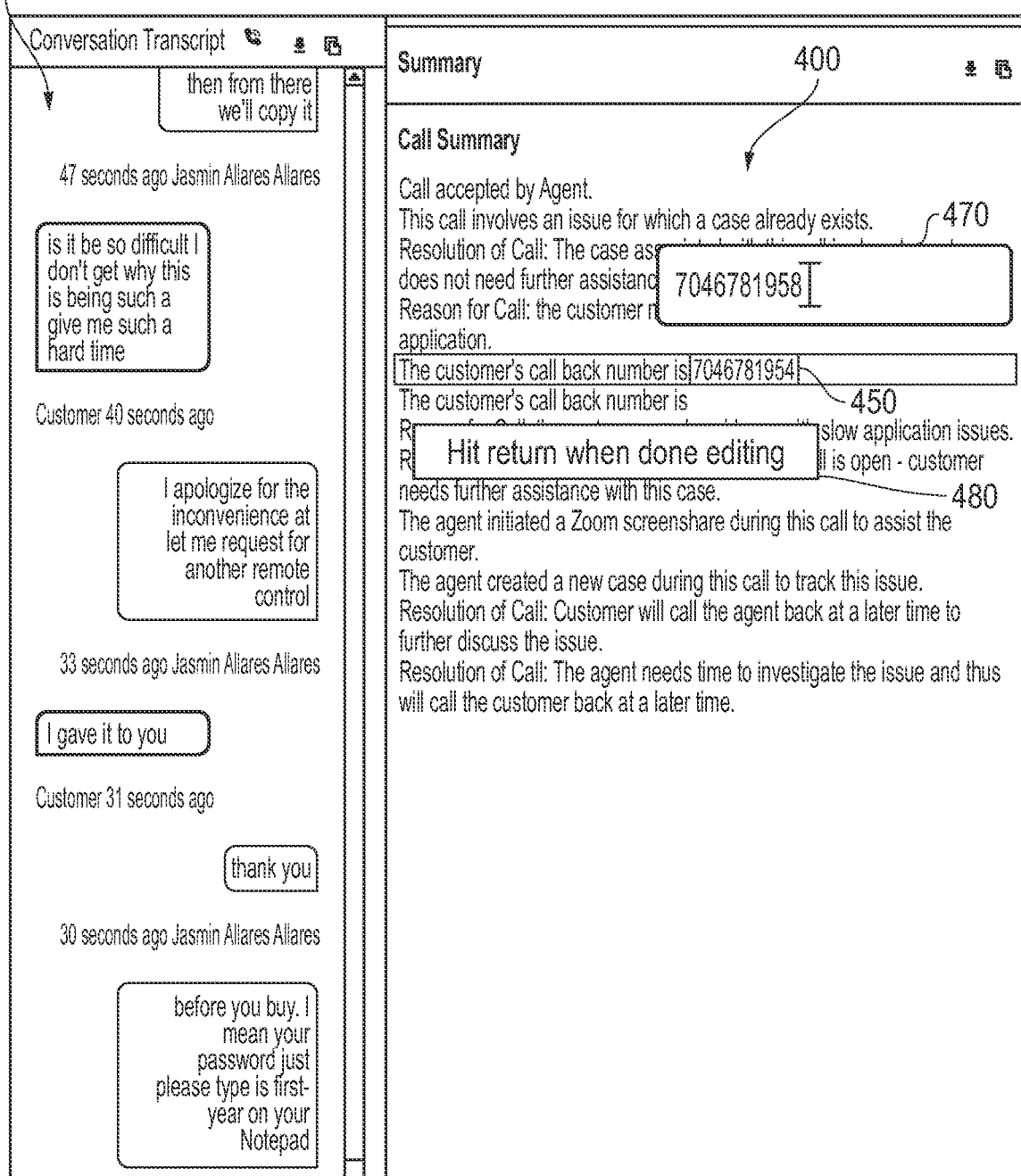
Figure 5D:
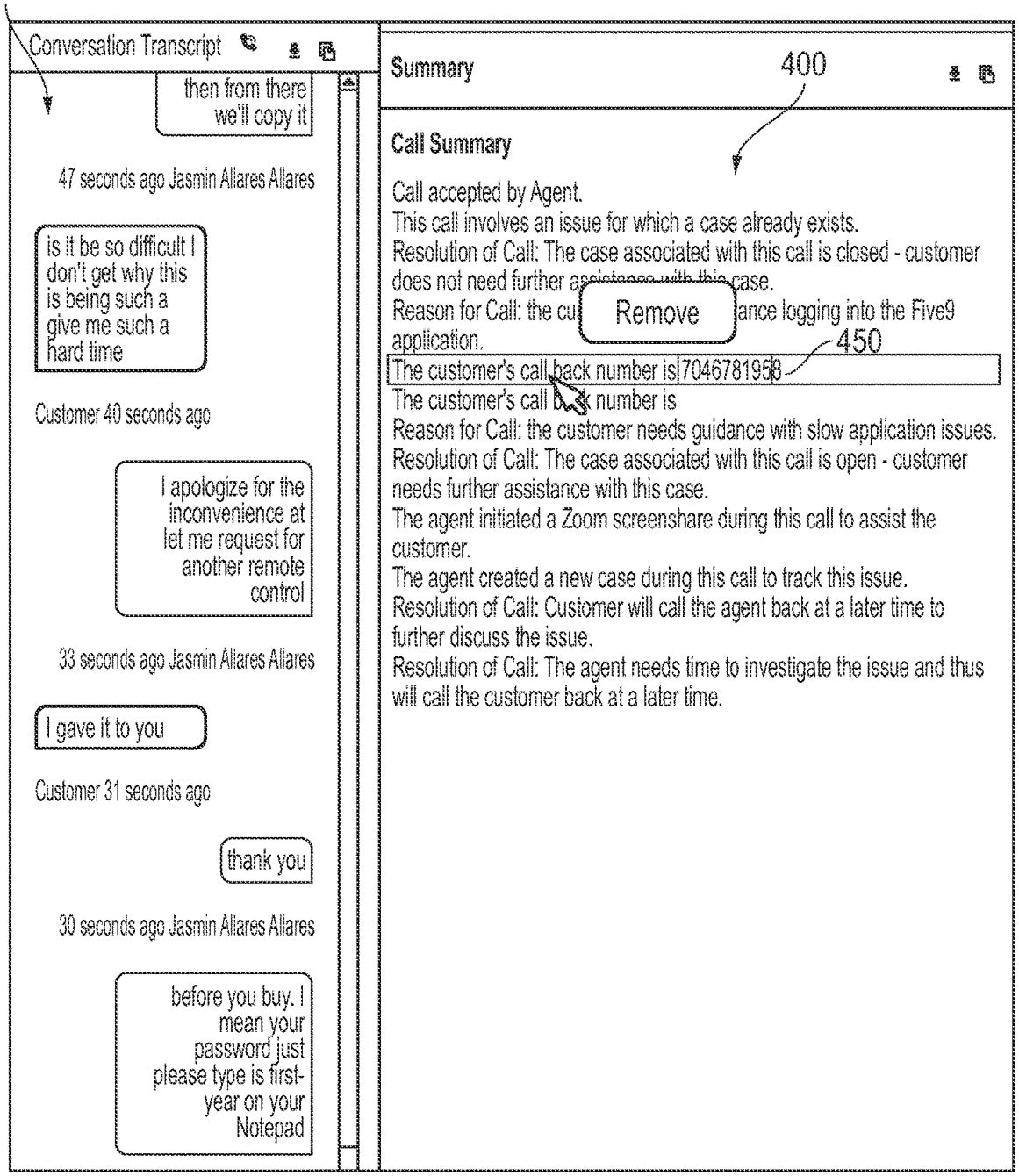
Figure 5E:
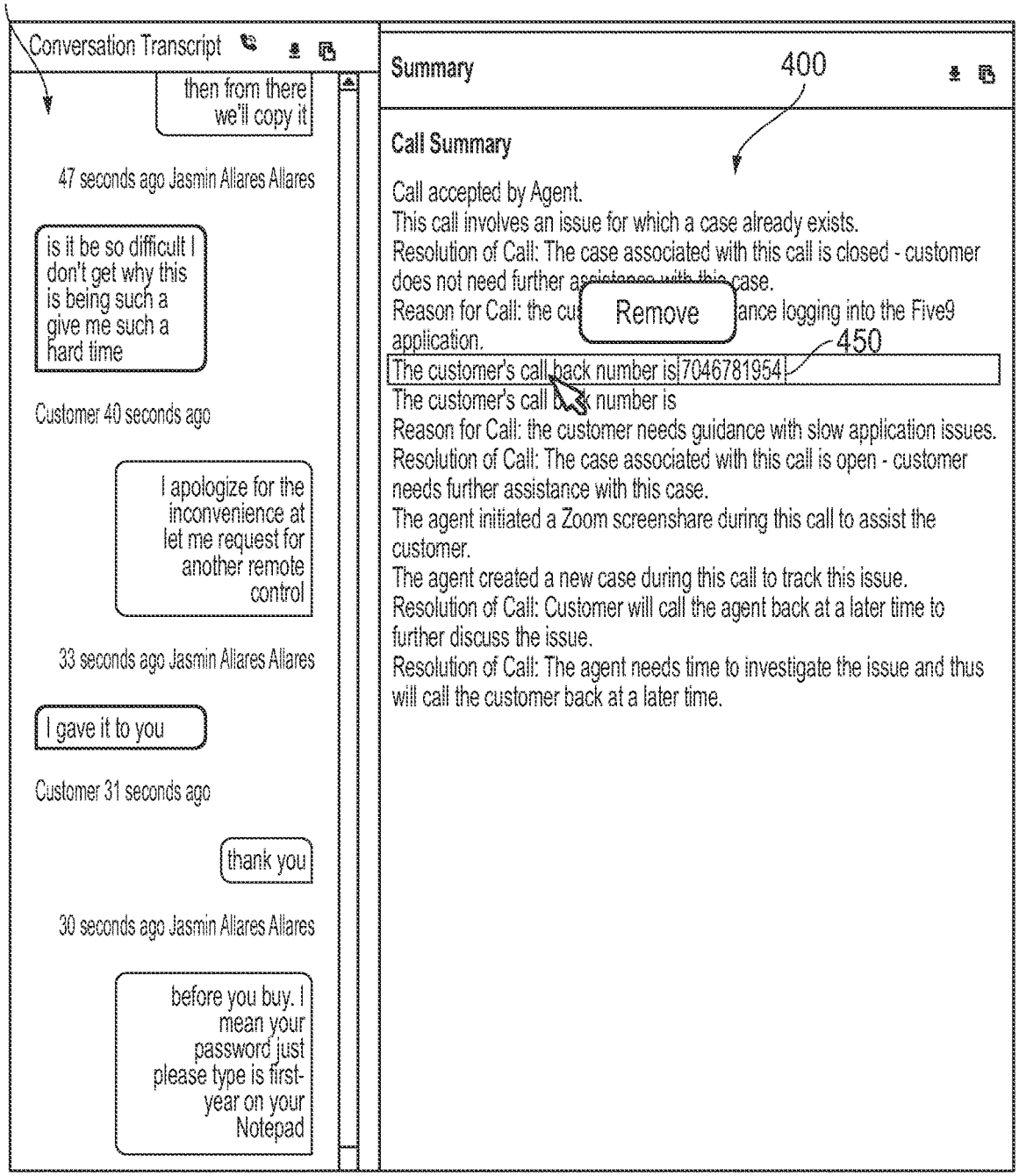

Referring to FIG. 5B, double clicking the entity 450 may prompt a separate window 470 for editing the entity—in this example, a callback number. The software may be programmed to recognize a phone number, and in turn, only allow numbers and special characters to be used in the editing window 470 for increased accuracy. Another tooltip 480 may instruct the agent to hit the return when done. Referring to FIG. 5C, an example is illustrated after an agent changes the entity 450 in the editing window 470. Referring to FIG. 5D, after an agent presses return to complete editing, the entity 450 is changed in the call summary and the tooltip 480 fades away.

Figure 5F:
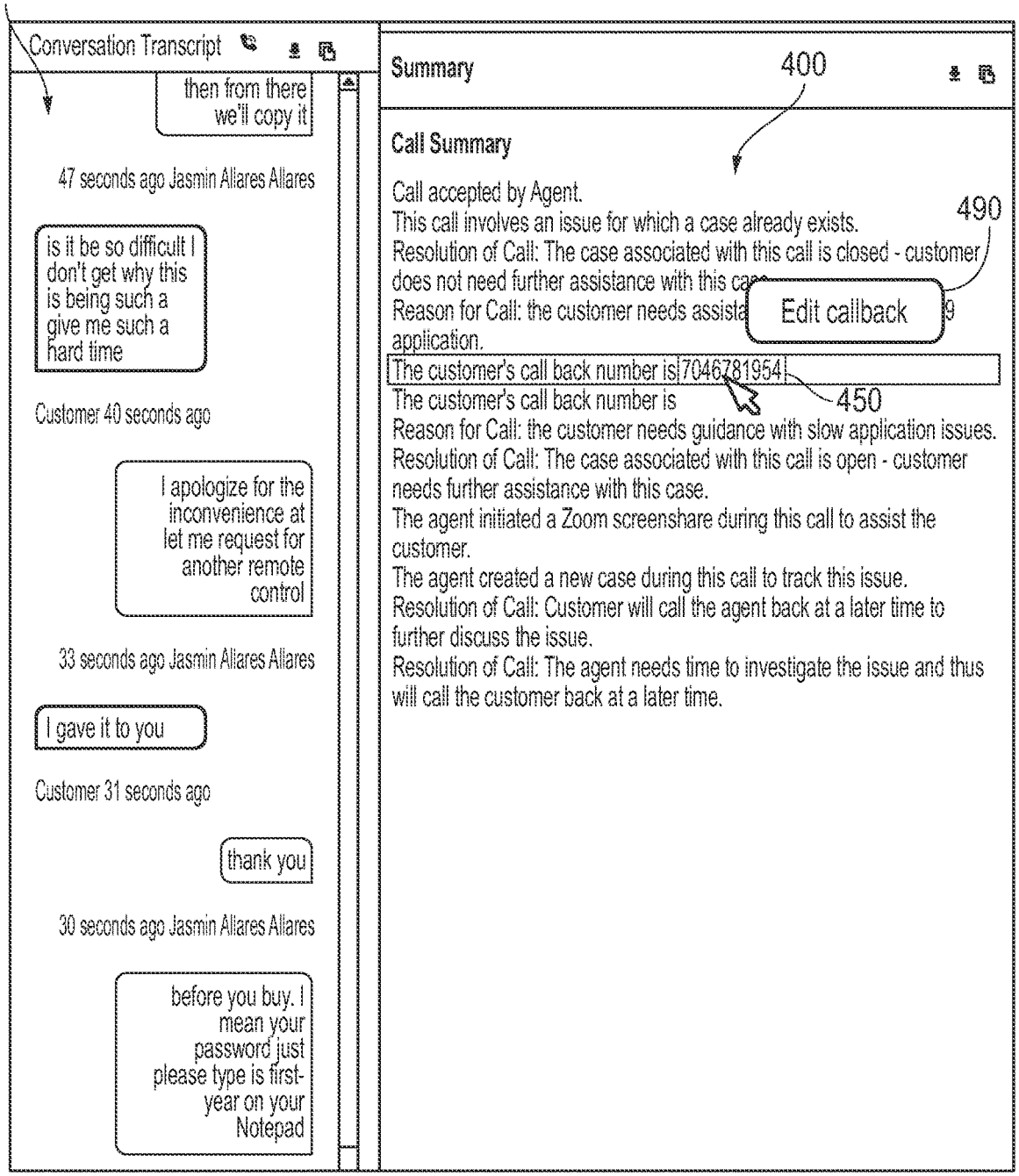
Figure 5G:
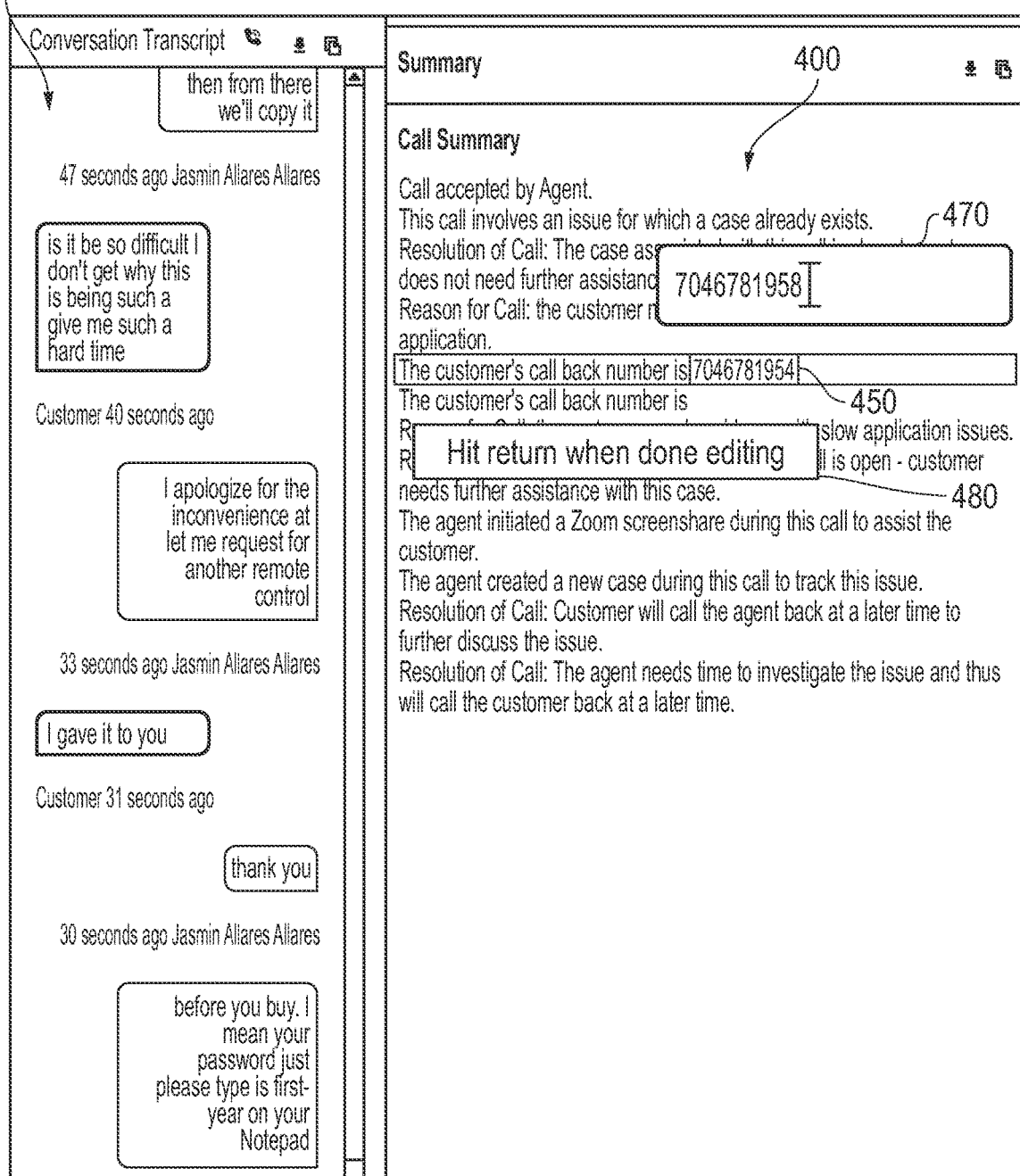
Figure 5H:
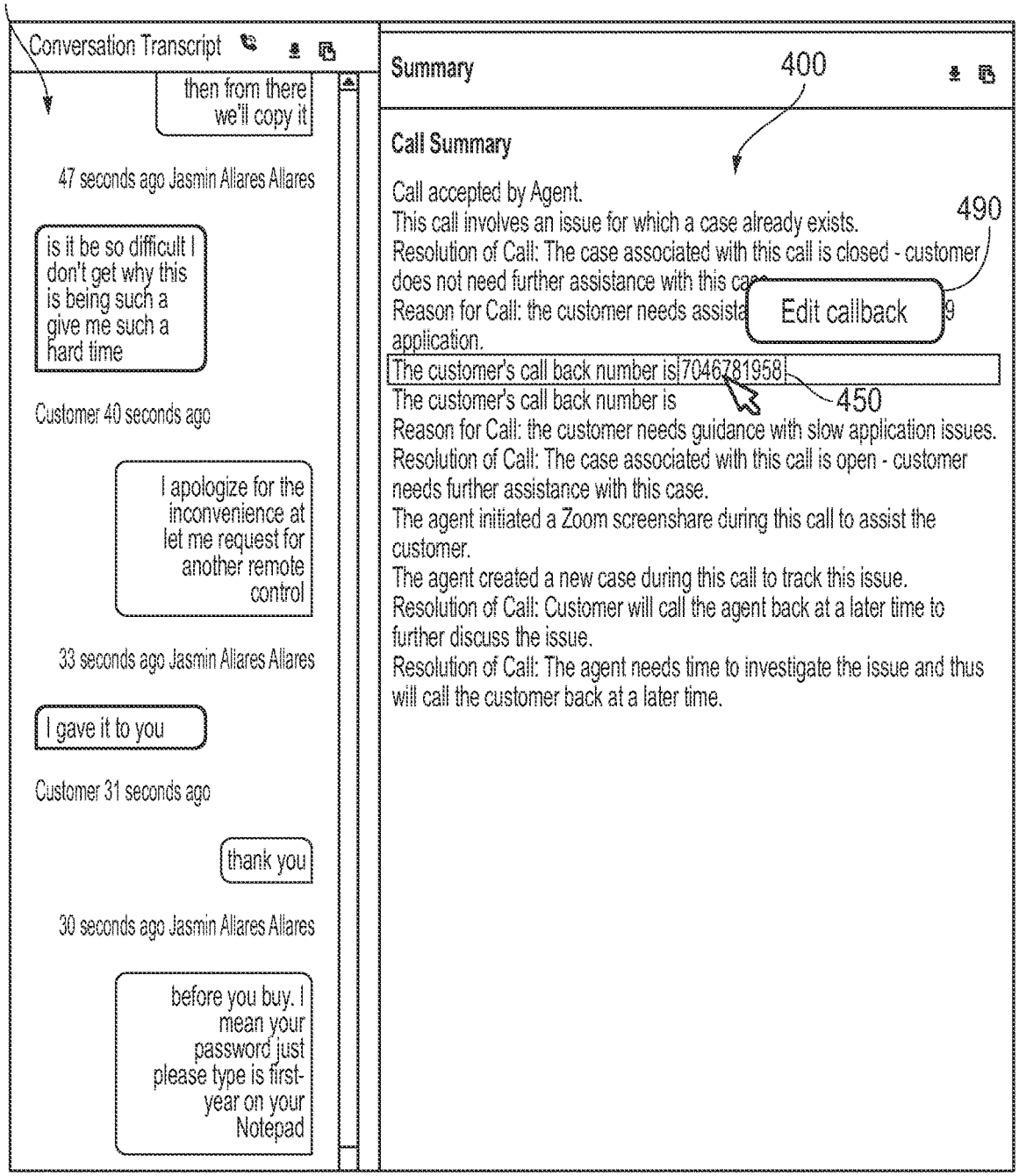

Referring to FIGS. 5E-5H, another example for editing an entity is illustrated. In this example and referring to FIG. 5E, an agent moves a mouse pointer to anywhere over the text associated with an intent that has one or more entities. The entity 450 itself is highlighted in some way as already described in reference with FIG. 5A. Referring to FIG. 5F, in response to the agent moving the mouse point over the entity, the remove button disappears and an edit callback button 490 may appear. As shown in FIG. 5G, pressing the edit callback button 490 may prompt the editing window 470 and tooltip 480 to appear like in FIG. 5C, and pressing return may complete the editing process as shown in FIG. 5H.

Because the interface already recognizes the type of entity, the edit form may be custom based on the type of entity. For example, dates may enable an NLP based date entry or calendar user interface entry. If an entity is an enumerated type, a dropdown list may be initiated including a typedown select function.

Figure 6A:
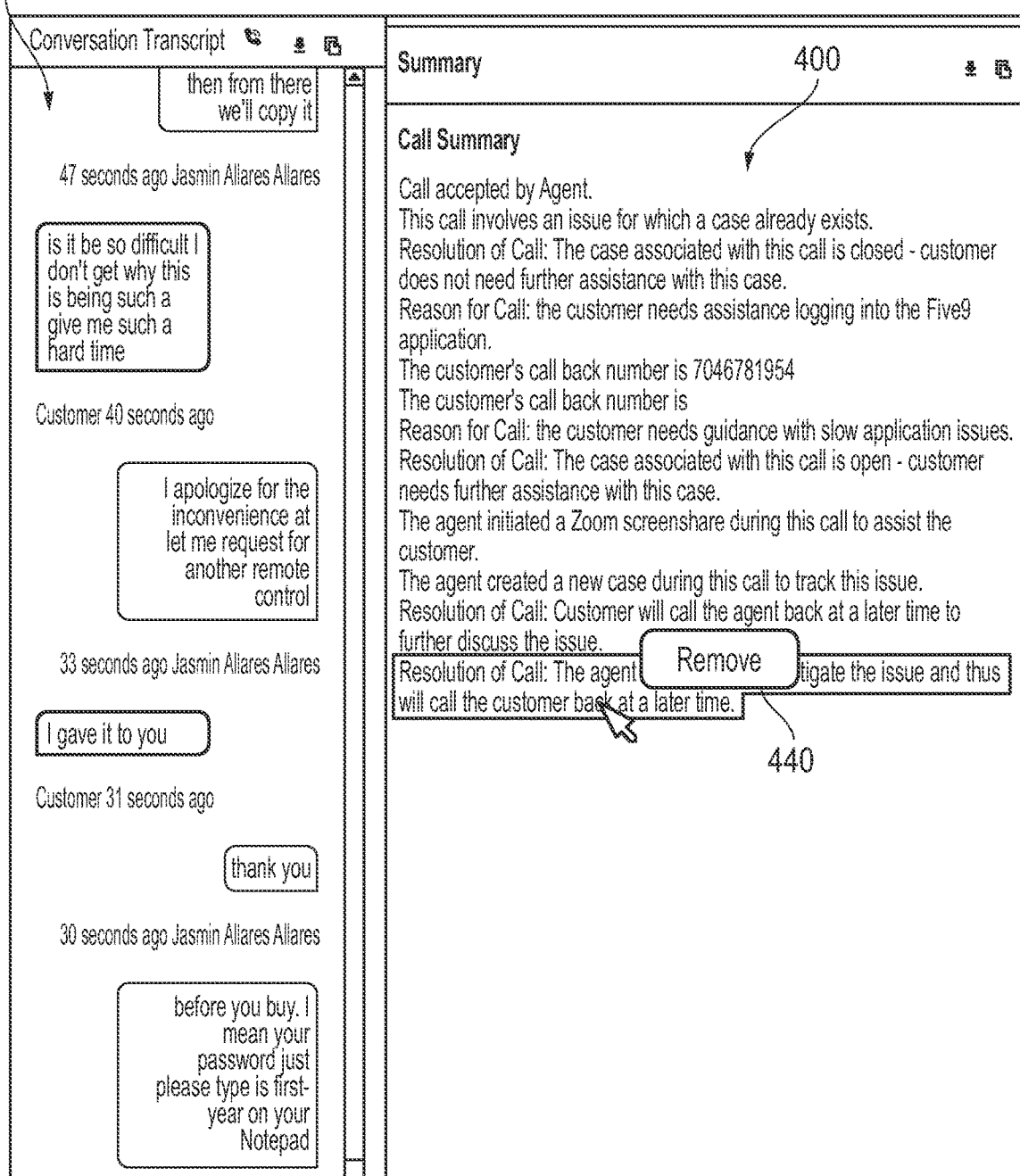

FIGS. 6A, 6B, and 6C are diagrams illustrating examples of user interfaces that allow an agent to reorder a call summary generated using the system of FIG. 1. Referring to FIG. 6A, when an agent moves a mouse pointer over text, the remove button 440 appears but the agent may continue to press down and drag the text segment. Referring to FIG. 6B, dragging the text segment allows the text to pop out. A blue bar may appear to indicate where the text will go if dropped. Referring to FIG. 6C, a new location for the text segment may be selected, and the text may be inserted into the new location and text segments below may slide down.

Figure 7A:
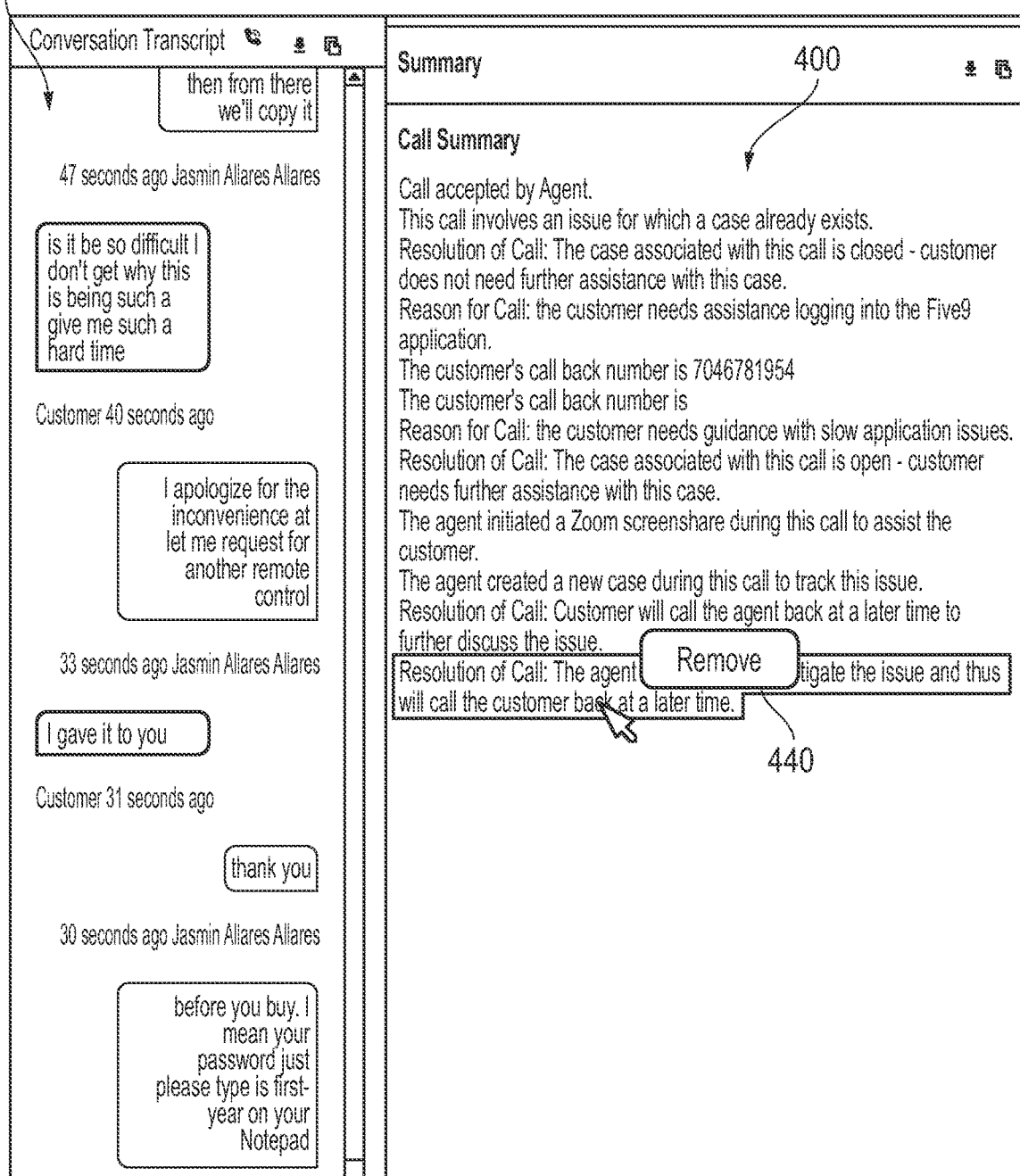
Figure 7C:
Figure 7C:
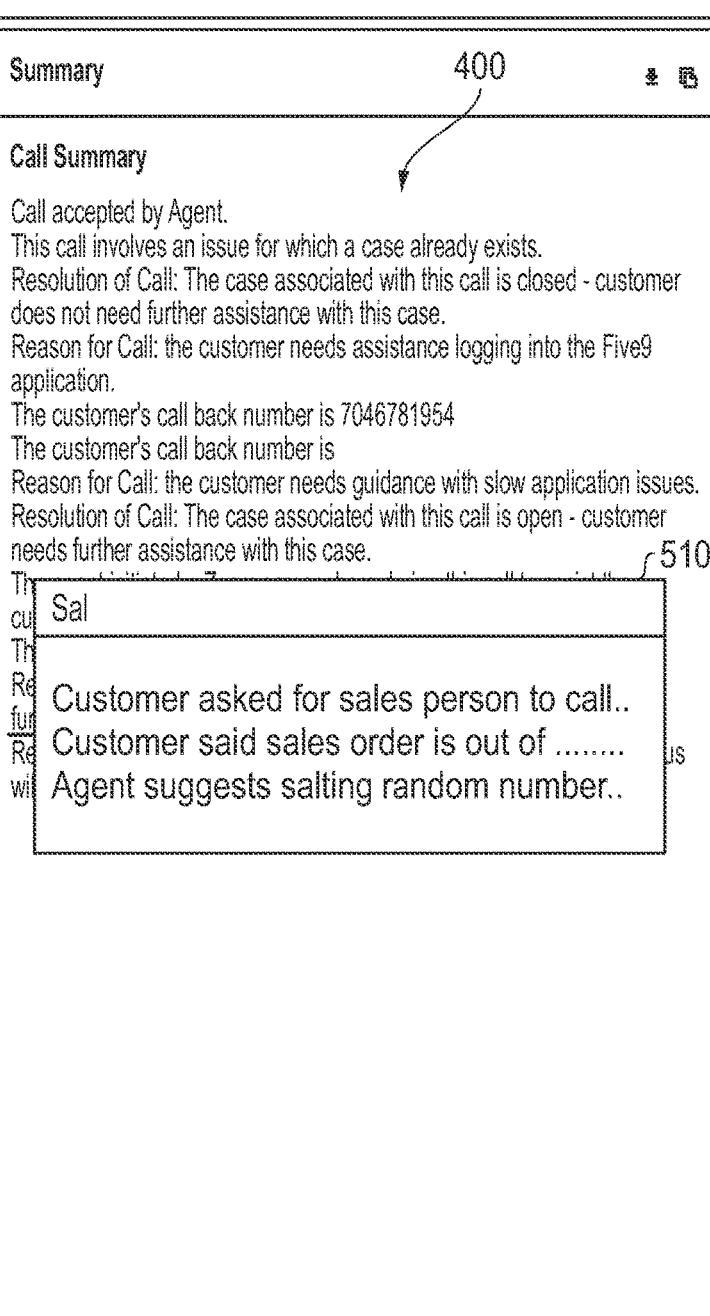

FIGS. 7A, 7B, and 7C are diagrams illustrating examples of user interfaces that allow an agent to add missing intents to a call summary generated using the system of FIG. 1. Referring to FIG. 7A, the remove button 440 appears but the agent may continue to move the mouse pointer to a transition point between text segments. Referring to FIG. 7B, once the transition point is reached an add button 520 may be prompted or any combination of a press or double clicking of the transition point will prompt the adding text function.

Referring to FIG. 7A, when the add text window 510 is prompted, an agent can start typing text. Since the intents are a finite set, a dropdown menu may use a typedown search. If the agent moves the mouse pointer to hover over text choices, the full text of the intent may be shown. Typedown can search intents over both the text of the phrase, as well as keywords which are associated with each intent. If the agent selects an existing intent, it may be added and used to automatically update the training set for the associated intent. If the agent continues to type and it is no longer a match for any text, the agent is adding freeform text. The freeform text would be inserted into the summary, and a notification may be sent to an administrator that a new intent may potentially need to be added. Alternatively, the agent can hit a +button at the bottom of the summary to add an intent, which produces the same dropdown menu and text entry box. In this case, the intent is added at the end of the summary. This eliminates the need for the agent to figure out where in the summary to add the missing intent.

Figure 8:
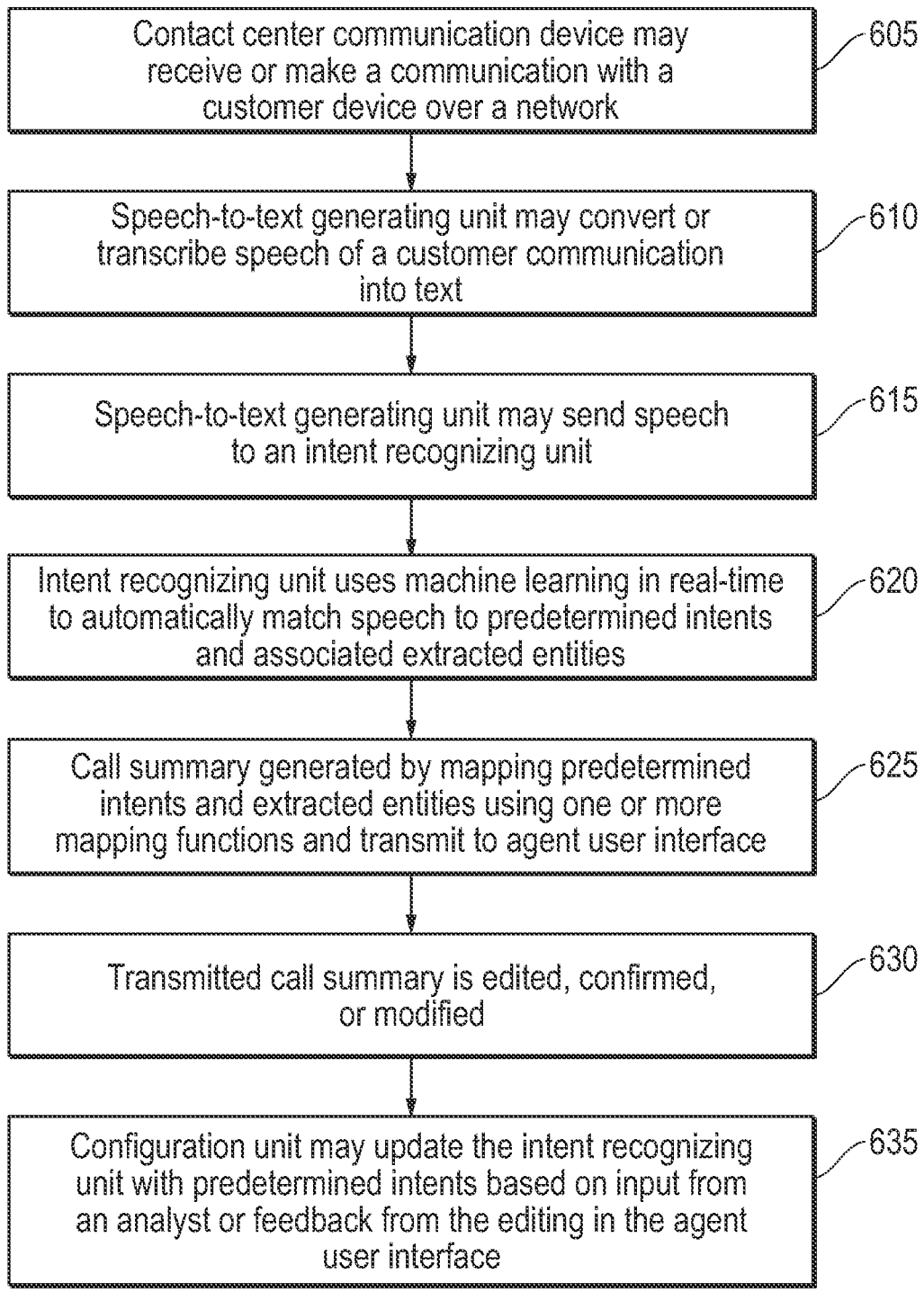
FIG. 8 is a diagram illustrating an example of a method for summarizing contact center calls using the system of FIG. 1.

FIG. 8 is a diagram illustrating an example of a method for summarizing contact center calls using the system of FIG. 1. Referring to FIG. 8, in step 605, a contact center communication device may receive or make a communication with a customer device over a network. In step 610, a speech-to-text generating unit may convert or transcribe speech of a customer communication into text. In step 615, the speech-to-text generating unit may send speech to an intent recognizing unit. In step 620, the intent recognizing unit uses machine learning in real-time to automatically match speech to predetermined intents and associated extracted entities. In step 625, a call summary is generated by mapping the predetermined intents and extracted entities using one or more mapping functions and transmitted to an agent user interface which can display the call summary. In step 630, the transmitted call summary is edited by one or more of removing false positive text segments, intents, or entities in the call summary, updating entities in the call summary, reordering the call summary, or adding missing intents to the call summary as described above in reference with FIGS. 3-7. In another step 635, which may or may not occur repeatedly, a configuration unit may update the intent recognizing unit with predetermined intents based on input from an analyst or feedback from the editing in the agent user interface.

Figure 9:
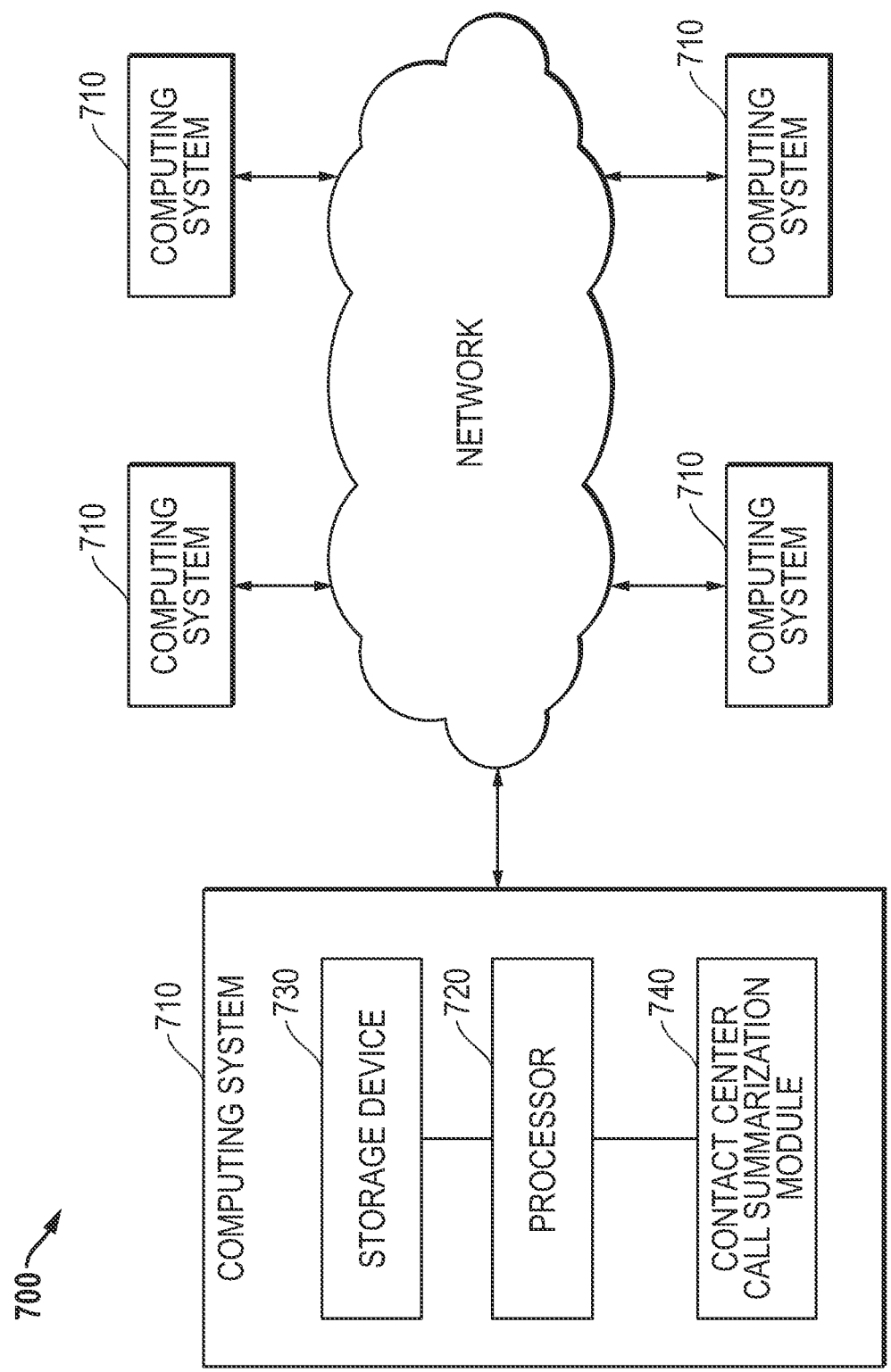
FIG. 9 is a block diagram of an example system for summarizing contact center calls.

FIG. 9 depicts an example diagram showing a system 700 for contact center call summarization. As shown in FIG. 9, the system 700 includes a computing system 710 which contains a processor 720, a storage device 730 and a contact center call summarization module 740. The computing system 710 includes any suitable type of computing device (e.g., a server, a desktop, a laptop, a tablet, a mobile phone, etc.) that includes the processor 720 or provides access to a processor via a network 750 or as part of a cloud based application. The contact center call summarization module 740 includes tasks (e.g., as described herein) and is implemented as part of a user interface module (not shown in FIG. 9).

Figure 10:
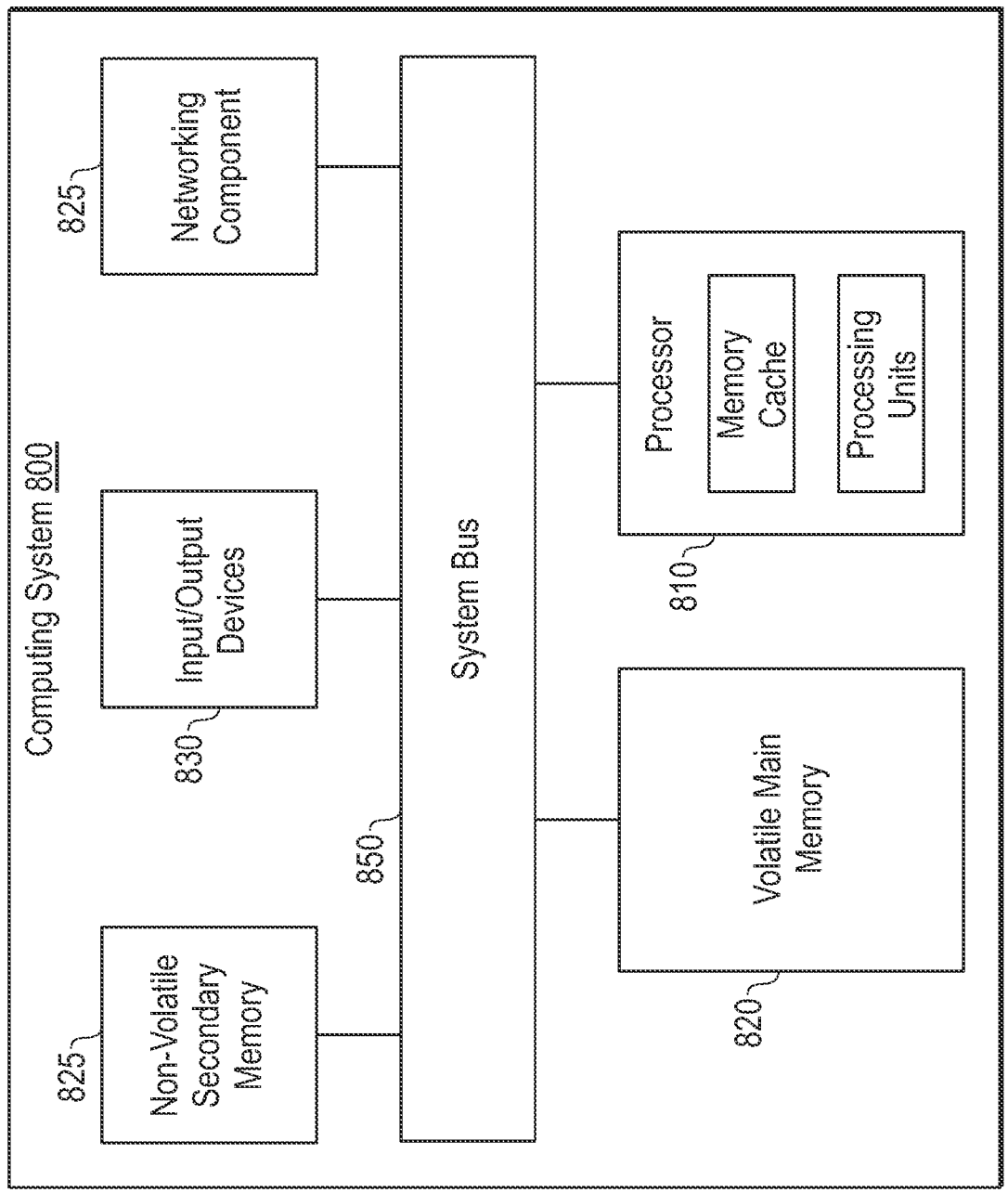
FIG. 10 is a block diagram of an example computer system for summarizing contact center calls.

FIG. 10 depicts an example diagram showing an example computing system 800 for contact center call summarization. As shown in FIG. 10, the computing system 800 includes a processor 810, memory devices 820 and 825, one or more input/output devices 830, one or more networking components 840, and a system bus 850. In some embodiments, the computing system 800 includes the contact center call summarization module, and provides access to the contact center call summarization module to a user as a stand-alone computer.

It should be understood that similar to the other processing flows described herein, the steps and the order of the steps in the flowchart described herein may be altered, modified, removed and/or augmented and still achieve the desired outcome. A multiprocessing or multitasking environment could allow two or more steps to be executed concurrently.

While examples have been used to disclose the invention, including the best mode, and also to enable any person skilled in the art to make and use the invention, the patentable scope of the invention is defined by claims, and may include other examples that occur to those of ordinary skill in the art. Accordingly the examples disclosed herein are to be considered non-limiting. As an illustration, an athlete score and/or a ranking of athletes may be generated using a number of different factors or based on a single factor.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowchart shown in FIGS. 3 and 12.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A method for creating a textual summary of a call, comprising: transcribing speech to a text in real time using a speech-to-text generating unit configured for execution upon one or more data processors;
automatically matching, in real-time, the text to predetermined intents and extracted entities using an intent recognizing unit, which is directly coupled to the speech-to-text generating unit for execution upon the one or more data processors;
automatically mapping the predetermined intents and extracted entities into a call summary using one or more mapping functions; and
displaying the call summary using an agent user interface for execution upon the one or more data processors, wherein the call summary is shown on the agent user interface overlaying or side-by-side with the text.

2. The method of claim 1, further comprising manually confirming the predetermined intents and extracted entities of the call summary using the agent user interface.

3. The method of claim 1, wherein the automatically mapping of the predetermined intents and extracted entities comprises converting the predetermined intents and extracted entities into text strings, each predetermined intent mapping to a text string with variables, the—variables corresponding to one or more of the extracted entities.

4. The method of claim 3, further comprising generating the call summary by creating a sequence in temporal order of the text strings.

5. The method of claim 1, further comprising removing false positive text segments, the predetermined intents, or the extracted entities in the call summary using the agent user interface.

6. The method of claim 1, further comprising updating or editing text segments, the predetermined intents, or the extracted entities in the call summary using the agent user interface.

7. The method of claim 1, further comprising reordering text segments, the predetermined intents, or the extracted entities in the call summary using the agent user interface.

8. The method of claim 1, further comprising manually adding text segments, other intents, or other entities to the call summary using the agent user interface.

9. The method of claim 1, further comprising manually or automatically updating or creating intents, entities, and associated training phrases based on removals, updates, edits or reorderings performed in the agent used interface.

10. A contact center call summarization system for generating a contact center call summary, comprising:
a speech-to-text generating unit configured for execution upon one or more data processors and configured to transcribe speech to a text in real-time;
an intent recognizing unit, which is directly coupled to the speech-to-text generating unit, for execution upon the one or more data processors and configured to automatically match, in real-time, the text to predetermined intents and extracted entities and automatically map the predetermined intents and extracted entities into a call summary using one or more mapping functions; and
an agent user interface for execution upon the one or more data processors and configured to display the call summary, wherein the call summary is shown on the agent user interface overlaying or side-by-side with the text.

11. The contact center call summarization system of claim 10, wherein the agent user interface is configured to allow manual confirmation of the predetermined intents and extracted entities of the call summary.

12. The contact center call summarization system of claim 10, wherein the agent user interface is configured to automatically map the predetermined intents and extracted entities by converting the predetermined intents and extracted entities into text strings, each predetermined intent mapping to a text string with variables, the variables corresponding to one or more of the extracted entities.

13. The contact center call summarization system of claim 12, wherein the agent user interface is further configured to generate the call summary by creating a sequence in temporal order of the text strings.

14. The contact center call summarization system of claim 10, where the agent user interface is configured to allow manually removing false positive text segments, the predetermined intents, or the extracted entities in the call summary.

15. The contact center call summarization system of claim 10, wherein the agent user interface is configured to allow manually updating or editing text segments, the predetermined intents, or the extracted entities in the call summary.

16. The contact center call summarization system of claim 10, wherein the agent user interface is configured to allow manually reordering text segments, the predetermined intents, or the extracted entities in the call summary.

17. The contact center call summarization system of claim 10, wherein the agent user interface is configured to allow manually adding text segments, other intents, or other entities to the call summary.

18. The contact center call summarization system of claim 10, further comprising an intent configuration unit for execution upon the one or more data processors and configured to update or create intents, entities, and associated training phrases for the intent recognizing unit.

19. Contact center call summarization system for generating a contact center call summary, comprising:
a contact center communication device configured to communicate with a customer communication device via a network;
a speech-to-text generating unit configured for execution upon one or more data processors and configured to convert speech of a customer communication into text;
an intent recognizing unit, which is directly coupled to the speech-to-text generating unit, for execution upon the one or more data processors and configured to receive transcribed speech from the speech-to-text generating unit and use machine learning to match speech to intents and entities;

an intent configuration unit for execution upon the one or more data processors and configured to update or create intents, entities, and associated training phrases for the intent recognizing unit; and an agent user interface for execution upon the one or more data processors and configured to display a call summary received from the intent recognizing unit to allow an agent to edit, replace, reorder, delete, or confirm text segments, intents, or entities of the call summary, wherein the call summary is shown on the agent user interface overlaying or side-by-side with the text.

20. The contact center call summarization system of claim 19, wherein the agent user interface is further configured to allow the agent to:

remove false positive text segments the intents, or the entities in the call summary;

update or edit text segments, the intents, or the entities in the call summary;

reorder text segments, the intents or the entities in the call summary; and add text segments, other intents, or other entities to the call summary.

* * * * *